(12) United States Patent
Hong et al.

(10) Patent No.: US 12,003,035 B2
(45) Date of Patent: Jun. 4, 2024

(54) DEVICE AND METHOD FOR IDENTIFYING STATUS OF EXTERNAL ELECTRONIC DEVICE

(71) Applicant: Samsung Electronics Co., Ltd., Gyeonggi-do (KR)

(72) Inventors: Ilpyo Hong, Gyeonggi-do (KR); Jihee Kang, Gyeonggi-do (KR); Jiyong Kim, Gyeonggi-do (KR); Jihoon Kim, Gyeonggi-do (KR); Jongin Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 744 days.

(21) Appl. No.: 17/259,416

(22) PCT Filed: Jul. 8, 2019

(86) PCT No.: PCT/KR2019/008371
§ 371 (c)(1),
(2) Date: Jan. 11, 2021

(87) PCT Pub. No.: WO2020/013549
PCT Pub. Date: Jan. 16, 2020

(65) Prior Publication Data
US 2021/0257748 A1    Aug. 19, 2021

(30) Foreign Application Priority Data
Jul. 9, 2018    (KR) ........................ 10-2018-0079557

(51) Int. Cl.
*H01Q 3/24*    (2006.01)
*H01Q 21/30*    (2006.01)
(Continued)

(52) U.S. Cl.
CPC ............... *H01Q 21/30* (2013.01); *H01Q 3/24* (2013.01); *H04B 17/12* (2015.01); *H04B 17/17* (2015.01); *H04B 17/318* (2015.01)

(58) Field of Classification Search
None
See application file for complete search history.

(56) References Cited

U.S. PATENT DOCUMENTS 8,340,597 B1 * 12/2012 Nabar .................. H04B 7/0417
                                                 455/67.11
10,979,193 B2 * 4/2021 Liu ........................ H04W 24/10
(Continued)

FOREIGN PATENT DOCUMENTS

KR        100948257        3/2010
WO    WO 2017196244       11/2017

OTHER PUBLICATIONS

KR Notice of Patent Grant dated Jan. 20, 2023 issued In counterpart application No. 10-2018-0079557, 5 pages.
(Continued)

*Primary Examiner* — Pablo N Tran
(74) *Attorney, Agent, or Firm* — The Farrell Law Firm, P.C.

(57) ABSTRACT

An electronic device for identifying a status of a wireless communication device of various embodiments of the present disclosure can include an antenna configured to receive wireless signals outputted from a first antenna and a second antenna included in an external electronic device, a communication circuit electrically connected to the antenna, and a control circuit. The control circuit can be configured to control the external electronic device wherein the external electronic device outputs specified wireless signals at a first specified phase by using the first antenna and at a second specified phase by using the second antenna, receive the specified wireless signals by using the antenna, identify a
(Continued)

signal intensity corresponding to the specified wireless signals by using the communication circuit, and determine a status related to the external electronic device at least on the basis of a difference value between the specified signal intensity and a reference signal intensity.

13 Claims, 12 Drawing Sheets

(51) Int. Cl.
  *H04B 17/12* (2015.01)
  *H04B 17/17* (2015.01)
  *H04B 17/318* (2015.01)

(56) References Cited

U.S. PATENT DOCUMENTS

| | | |
|---|---|---|
| 2009/0153394 A1 | 6/2009 | Navarro et al. |
| 2009/0232010 A1 | 9/2009 | Li et al. |
| 2010/0127917 A1 | 5/2010 | Lin et al. |
| 2012/0045996 A1 | 2/2012 | Uno et al. |
| 2013/0235962 A1 | 9/2013 | O'Keefe et al. |
| 2014/0010178 A1* | 1/2014 | Yu ................... H04B 7/0695 370/329 |
| 2016/0011292 A1 | 1/2016 | Li et al. |
| 2017/0104517 A1* | 4/2017 | Kakishima ........... H04B 7/0617 |
| 2018/0109303 A1* | 4/2018 | Yoo ................... H04B 7/0619 |
| 2018/0191418 A1* | 7/2018 | Xia ..................... H04B 7/088 |

OTHER PUBLICATIONS

Korean Office Action dated Jul. 25, 2022 issued in counterpart application No. 10-2018-0079557, 13 pages.
PCT/ISA/210 Search Report issued on PCT/KR2019/008371, dated Jul. 8, 2019, pp. 7.
PCT/ISA/237 Written Opinion issued on PCT/KR2019/008371, dated Jul. 8, 2019, pp. 10.
Korean Office Action dated Jan. 21, 2022 issued in counterpart application No. 10-2018-0079557, 13 pages.

* cited by examiner

DEVICE AND METHOD FOR IDENTIFYING STATUS OF EXTERNAL ELECTRONIC DEVICE

PRIORITY

This application is a National Phase Entry of International Application No. PCT/KR2019/008371, which was filed on Jul. 8, 2019, and claims priority to Korean Patent Application No. 10-2018-0079557, filed in the Korean Intellectual Property Office on Jul. 9, 2018, the entire content of each of which is incorporated herein by reference.

BACKGROUND

1. Field

Various embodiments of the present disclosure relate to a device and method for identifying a status of an external electronic device.

2. Related Art

To meet a wireless data traffic demand that is on the trend of increase after the commercialization of 4th generation (4G) communication systems, an effort for developing improved 5th generation (5G) communication systems or pre-5G communication systems is being made. For this reason, the 5G communication systems or the pre-5G communication systems are being called beyond 4G network communication systems or post long term evolution (post LTE) systems.

To achieve a high data transmission rate, the 5G communication systems are considering implementation at an ultra-high frequency (mmWave) band (for example, such as a 60 GHz band). To increase a path loss alleviation of radio waves at the ultra-high frequency band and a propagation distance of the radio waves, the 5G communication systems are discussing beamforming, massive multiple input multiple output (MIMO), full dimensional-MIMO (FD-MIMO), array antenna, analog beamforming, and large-scale antenna technologies.

Also, for the purpose of system network improvement, the 5G communication systems are achieving the development of technologies such as an evolved small cell, an advanced small cell, a cloud radio access network (cloud RAN), an ultra-dense network, device to device communication (D2D), wireless backhaul, a moving network, cooperative communication, coordinated multi-points (CoMP), and received interference cancellation, etc.

Besides this, the 5G systems are developing an advanced coding modulation (ACM) scheme being hybrid frequency shift keying and quadrature amplitude modulation (FQAM) and sliding window superposition coding (SWSC), and an advanced access technology being filter bank multi carrier (FBMC), non-orthogonal multiple access (NOMA), and sparse code multiple access (SCMA), etc.

The use of beamforming can be demanded in wireless communication that uses an ultra high frequency. To perform the beamforming, an electronic device can use an antenna array including many antennas. To identify whether the electronic device including the antenna array is normally operated, there is a need to identify a characteristic of a beam (for example, an intensity of the beam) for possible all directions of the beam.

When identifying the characteristic of the beam for the possible all directions of the beam, devices (for example, signal detectors) for identifying the characteristic of the beam can be provided in locations corresponding to the possible all directions respectively or, in accordance with a direction change of the beam, the device for identifying the characteristic of the beam can move while identifying the characteristic of the beam, but there can be difficulties in aspects of space and cost.

Also, when performing an inspection on each of a plurality of antennas in order to determine a fault of one of the plurality of antennas included in the antenna array, there can be difficulties in aspects of time.

SUMMARY

An electronic device for identifying a status of a wireless communication device of various embodiments of the present disclosure can include an antenna configured to receive wireless signals outputted from a first antenna and a second antenna included in an external electronic device, a communication circuit electrically connected to the antenna, and a control circuit. The control circuit can be configured to control the external electronic device wherein the external electronic device outputs specified wireless signals at a first specified phase by using the first antenna and at a second specified phase by using the second antenna, receive the specified wireless signals by using the antenna, identify a signal intensity corresponding to the specified wireless signals by using the communication circuit, and determine a status related to the external electronic device at least on the basis of a difference value between the specified signal intensity and a reference signal intensity.

An electronic device for identifying a status of a wireless communication device of various embodiments of the present disclosure can include an antenna configured to receive wireless signals outputted from a first antenna and a second antenna included in an external electronic device, a communication circuit electrically connected to the antenna, and a control circuit. The control circuit can be configured to control the external electronic device wherein the external electronic device outputs first wireless signals at a first specified phase by using the first antenna and at the first specified phase by using the second antenna, control the external electronic device wherein the external electronic device outputs second signals at the first specified phase by using the first antenna and at a second specified phase by using the second antenna, receive the first wireless signals and the second wireless signals by using the antenna, identify a first signal intensity corresponding to the first wireless signals and a second signal intensity corresponding to the second wireless signals by using the communication circuit, and determine a status related to the external electronic device at least on the basis of a difference value between the first signal intensity and the second signal intensity.

A checking method of various embodiments of the present disclosure can identify a characteristic of a beam efficiently in aspects of space, cost, and time by differently setting a phase of at least one beam among a plurality of beams and phases of remaining beams among the plurality of beams.

A checking method of various embodiments of the present disclosure can check and identify whether a phase shifter and a power amplifier included in an electronic device are normally operated, without having many signal detectors corresponding to many directions respectively, in order to determine whether the phase shifter is normally operated.

DETAILED DESCRIPTION

Figure 1:
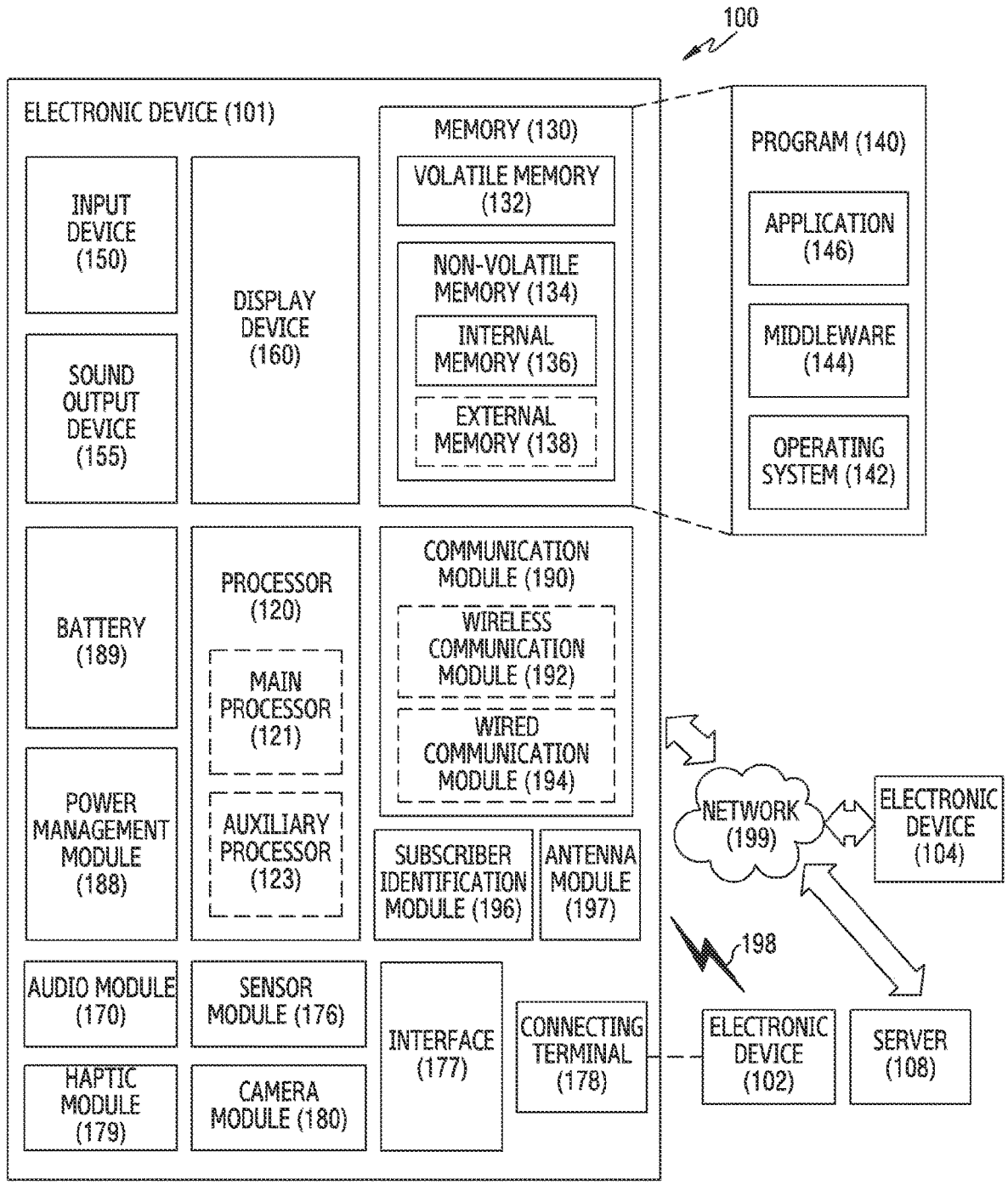
FIG. 1 is a block diagram of an electronic device within a network environment according to various embodiments of the present disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally, or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
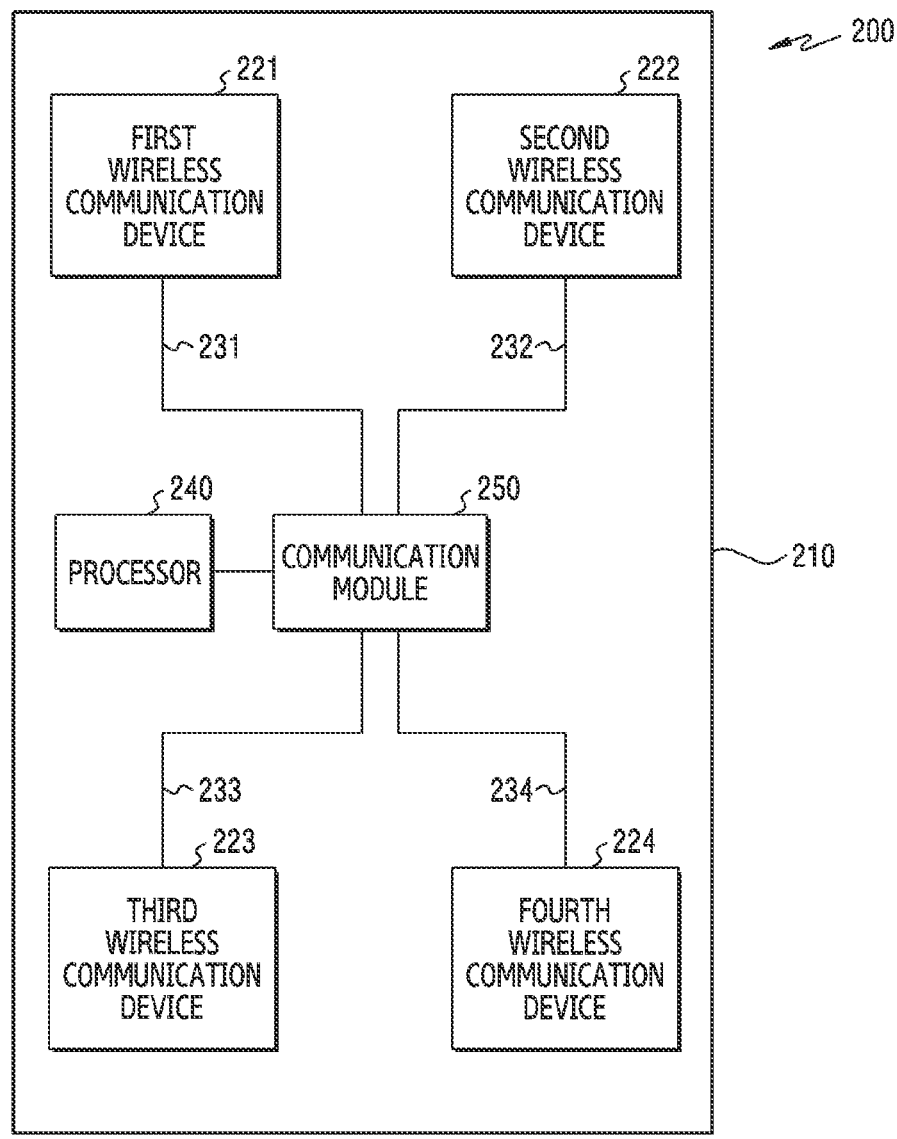
FIG. 2A is a diagram illustrating an arrangement relationship of wireless communication devices in an electronic device according to various embodiments of the present disclosure.

FIG. 2A is a diagram illustrating an arrangement relationship of wireless communication devices according to various embodiments of the present disclosure.

The electronic device 200 of FIG. 2A can be constructed at least in part similarly to, or identically with, the electronic device 101 illustrated in FIG. 1.

Referring to FIG. 2A, the electronic device 200 can include a housing 210, a first wireless communication device 221, a second wireless communication device 222, a third wireless communication device 223, a fourth wireless communication device 224, a first conductive line 231, a second conductive line 232, a third conductive line 233, a fourth conductive line 234, a processor 240, or a communication module 250 (e.g., the communication module 190 of FIG. 1).

According to an embodiment, the housing 210 can protect other components of the electronic device 200. The housing 210, for example, can include a front plate, a back plate facing away from the front plate, and a side member (or a metal frame) attached to the back plate or formed integrally with the back plate and surrounding a space between the front plate and the back plate.

According to an embodiment, the electronic device 200 can include at least one of the first wireless communication device 221, the second wireless communication device 222, the third wireless communication device 223, or the fourth wireless communication device 224.

According to an embodiment, the first wireless communication device 221, the second wireless communication device 222, the third wireless communication device 223, or the fourth wireless communication device 224 can be located within the housing 210. For example, when viewing above the back plate of the electronic device 200, the first wireless communication device 221 can be disposed at a left upper end of the electronic device 200, and the second wireless communication device 222 can be disposed at a right upper end of the electronic device 200, and the third wireless communication device 223 can be disposed at a left lower end of the electronic device 200, and the fourth wireless communication device 224 can be disposed at a right lower end of the electronic device 200.

According to an embodiment, the communication module 250 can be connected to at least one of the first wireless communication device 221, the second wireless communication device 222, the third wireless communication device 223, or the fourth wireless communication device 224. For example, the first wireless communication device 221, the second wireless communication device 222, the third wireless communication device 223, or the fourth wireless communication device 224 each can be electrically connected to the communication module 250 through the first conductive line 231, the second conductive line 232, the third conductive line 233, or the fourth conductive line 234. The first conductive line 231, the second conductive line 232, the third conductive line 233, or the fourth conductive line 234 can include a coaxial cable or a flexible PCB (FPCB). In accordance with various embodiments, the conductive line can include all substrates of the same or similar meaning with those of an interface, a connection circuit transmission line, a feeding line, and/or a microstrip line.

According to another embodiment, the first wireless communication device 221, the second wireless communication device 222, the third wireless communication device 223, or the fourth wireless communication device 224 can receive a signal from an external electronic device or a base station, and convert a frequency band of the received signal. For example, the first wireless communication device 221, the second wireless communication device 222, the third wireless communication device 223, or the fourth wireless communication device 224 can down convert a frequency band of a signal received through a radio frequency (RF) band into an intermediate frequency (IF) band. For another example, a communication device (e.g., the first wireless communication device 221, the second wireless communication device 222, the third wireless communication device 223, or the fourth wireless communication device 224) can receive a signal of an IF band from the communication module 250, and up convert the received signal of the IF band into an RF band, and transmit to the external electronic device or base station through the antenna array.

According to various embodiments, the communication module 250 can include a communication processor (CP), and the communication processor can include a wireless modem. The communication module 250 can receive a baseband signal from the processor 240, and up convert the received baseband signal into an IF signal of an intermediate frequency band, thereby transmitting the up converted IF signal to the wireless communication device (e.g., the first wireless communication device 221, the second wireless communication device 222, the third wireless communication device 223, or the fourth wireless communication device 224). The communication module 250 can receive an IF signal of an intermediate frequency band from the wireless communication device (e.g., the first wireless communication device 221, the second wireless communication device 222, the third wireless communication device 223, or the fourth wireless communication device 224), and down convert the received IF signal into a baseband signal, thereby transmitting the down converted signal to the processor 240.

Though not illustrated, the communication module 250 of various embodiments can include a plurality of constructions for the sake of frequency conversion between an IF band and a baseband. For example, the communication module 250 can include at least one of a filter, a divider, a single pole dual through (SPDT) switch, an up/down converter, a mixer, a transmit analog baseband (TXABB), or a receive analog baseband (RXABB).

According to an embodiment, the communication module 250 can include a first baseband processor (BP) (not shown) or a second baseband processor (BP) (not shown). The electronic device 200 can further include one or more interfaces for supporting inter chip communication between the first BP (or the second BP) and the processor 240. The processor 240 and the first BP or second BP can transmit and/or receive data by using an inter chip interface (i.e., an inter processor communication channel).

According to an embodiment, the first BP or the second BP can offer an interface for performing communication with other entities. The first BP, for example, can support wireless communication for a first network (not shown). The second BP, for example, can support wireless communication for a second network (not shown). The first network (not shown) or the second network (not shown) can correspond to the network 199 of FIG. 1. According to an embodiment, the first network (not shown) and the second network (not shown) each can include a 4th generation (4G) network and a 5th generation (5G) network. The 4G network, for example, can support a long term evolution (LTE) protocol which is stipulated by 3GPP. The 5G network, for example, can support a new radio (NR) protocol which is stipulated by 3GPP.

According to an embodiment, the first BP or the second BP can form one module with the processor 240. For example, the first BP or the second BP can be integrally formed with the processor 240. For another example, the first BP or the second BP can be disposed within one chip, or be formed in an independent chip form. According to an embodiment, the processor 240 and at least one baseband processor (e.g., the first BP) can be integrally formed within one chip (SoC chip), and another baseband processor (e.g., the second BP) can be formed in an independent chip form.

According to an embodiment, the processor 240 can include one or more of a central processing unit (CPU), an application processor (AP), a graphic processing unit (GPU), an image signal processor of a camera, or a baseband processor (or a communication processor (CP)). According to an embodiment, the processor 240 can be implemented as a system on chip (SoC) or a system in package (SiP).

Figure 2B:
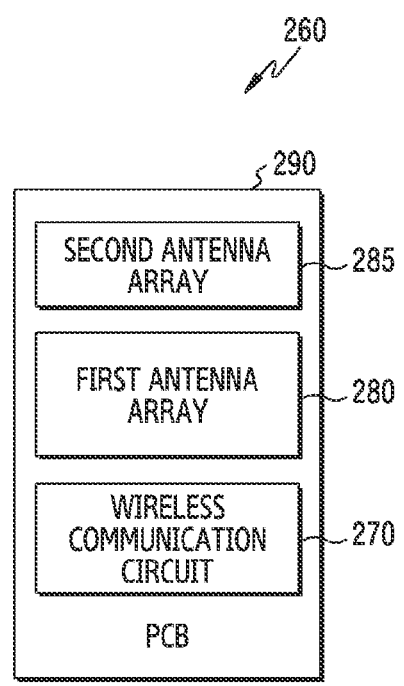
FIG. 2B is a block diagram of a wireless communication device according to various embodiments of the present disclosure.

FIG. 2B is a block diagram of a wireless communication device according to various embodiments of the present disclosure.

The wireless communication device 260 of FIG. 2B can correspond to the first wireless communication device 221, the second wireless communication device 222, the third wireless communication device 223, or the fourth wireless communication device 224 illustrated in FIG. 2A.

Referring to FIG. 2B, the wireless communication device 260 (e.g., the first wireless communication device 221) can include a wireless communication circuit 270 (e.g., a radio frequency integrated circuit (RFIC)), a PCB 290, a first antenna array 280, or a second antenna array 285.

According to an embodiment, the wireless communication circuit 270, the first antenna array 280 or the second antenna array 285 can be located in the PCB 290. For example, the first antenna array 280 or the second antenna array 285 can be disposed in a first surface of the PCB 290, and the wireless communication circuit 270 can be located in a second surface of the PCB 290. The PCB 290 can include a connector (e.g., a coaxial cable connector or a board to board (B-to-B) connector) for electrically connecting with a main PCB (e.g., a PCB in which the communication module 250 of FIG. 2A is disposed) by using a transmission line (e.g., the first conductive line 231 of FIG. 2A). The PCB 290 is, for example, connected, by the coaxial cable, with the main PCB in which the communication module 250 is disposed, using the coaxial cable connector. The coaxial cable can be used for forwarding a transmission and reception IF signal or RF signal. In another example, a power source or other control signals can be forwarded through the B-to-B connector.

According to an embodiment, the first antenna array 280 or the second antenna array 285 can include a plurality of antennas. The plurality of antennas can include a patch antenna, a loop antenna or a dipole antenna. For example, the antennas included in the first antenna array 280 can be patch antennas for forming a beam towards the back plate of the electronic device 200. For another example, the antennas included in the second antenna array 285 can be dipole antennas or loop antennas for forming a beam towards the side member of the electronic device 200.

According to an embodiment, the wireless communication circuit 270 can support at least a partial band (e.g., 24 GHz to 30 GHz or 37 GHz to 40 GHz) among 20 GHz to 100 GHz bands. According to an embodiment, the wireless communication circuit 270 can up convert or down convert a frequency. For example, the wireless communication circuit 270 included in the wireless communication device 260 (e.g., the first wireless communication device 221 of FIG. 2A) can up convert an IF signal received from a communication module (e.g., the communication module 250 of FIG. 2A) through a conductive line (e.g., the first conductive line 231 of FIG. 2A), into an RF signal. For another example, the wireless communication circuit 270 included in the wireless communication device 260 (e.g., the first wireless communication device 221 of FIG. 2A) can down convert an RF signal (e.g., a millimeter wave signal) received through the first antenna array 280 or the second antenna array 285, into an IF signal, and transmit to the communication module (e.g., the communication module 250 of FIG. 2A) by using the conductive line (e.g., the first conductive line 231 of FIG. 2A).

Figure 3:
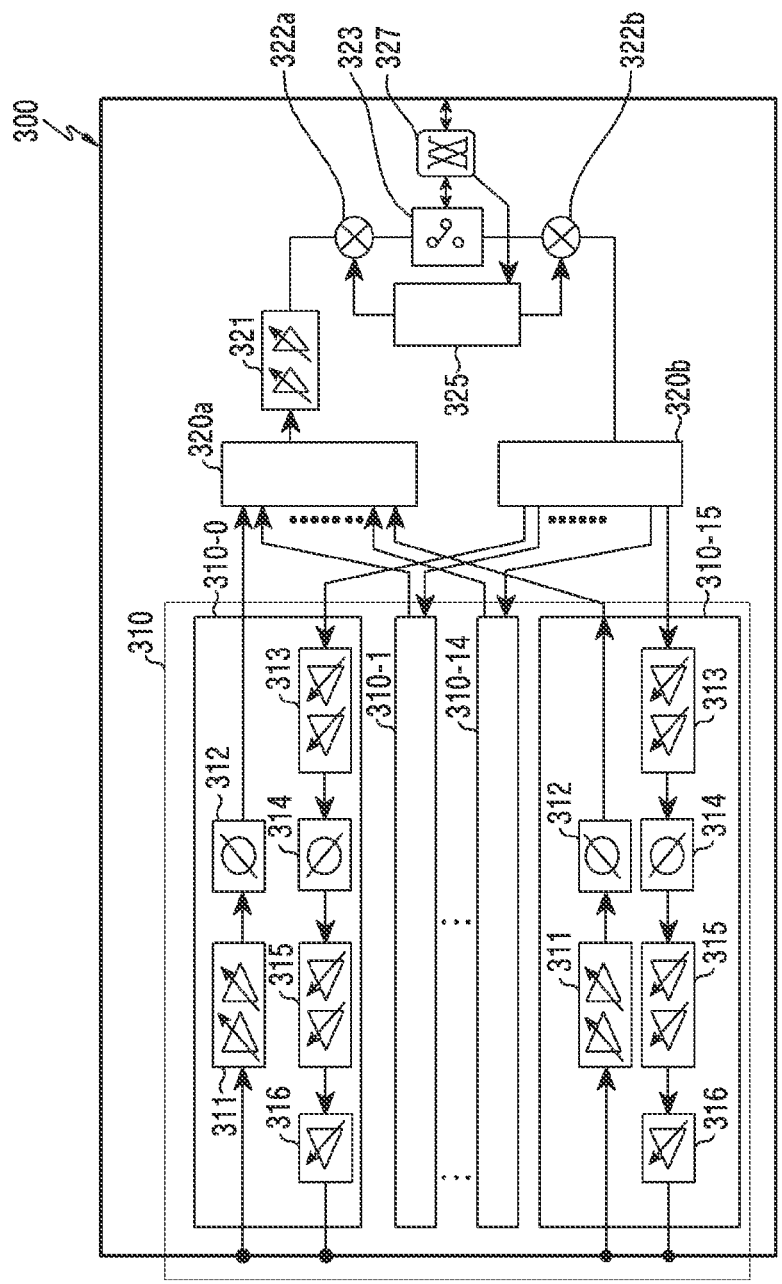
FIG. 3 illustrates a circuit representing a detailed construction of a wireless communication circuit according to various embodiments of the present disclosure.

FIG. 3 illustrates a circuit representing a detailed construction of a wireless communication circuit according to various embodiments of the present disclosure.

Referring to FIG. 3, the wireless communication circuit 300 (e.g., the wireless communication circuit 270 of FIG. 2B) of various embodiments of the present disclosure can include at least one of a transmission and/or reception circuit 310, a combiner 320a, a divider 320b, an RBDA 321, a reception mixer 322a, a transmission mixer 322b, a transmission and/or reception conversion switch 323, a local oscillator 325, a signal divider 327, and/or a controller (not shown). The transmission and/or reception circuit 310 can include many transmission and/or reception sub circuits. For example, the transmission and/or reception circuit 310 can include a first transmission and/or reception sub circuit 310-0 to a sixteenth transmission and/or reception sub circuit 310-15. The number of the transmission and/or reception sub circuits can correspond to the number of a plurality of antennas. For example, in response to a wireless communication device (e.g., the first wireless communication device 221 of FIG. 2A) including a 1×4 antenna array, the number of the plurality of antennas and the number of transmission and/or reception sub circuits can be 4. For another example, in response to the wireless communication device (e.g., the first wireless communication device 221 of FIG. 2A) including a 4×4 antenna array, the number of the plurality of antennas and the number of transmission and/or reception sub circuits can be 16.

In accordance with various embodiments, at least one of the first transmission and/or reception sub circuit 310-0 to the sixteenth transmission and/or reception sub circuit 310-15 can be connected to at least one antenna. For example, many antennas connected with the first transmission and/or reception sub circuit 310-0 to the sixteenth transmission and/or reception sub circuit 310-15 can form one antenna array. In accordance with an embodiment, the first transmission and/or reception sub circuit 310-0 to the sixteenth transmission and/or reception sub circuit 310-15 can include at least one of a low noise amplifier (LNA) 311, a phase shifter (PS) 312, a phase shifter drive amplifier (PSDA) 313, a PS 314, a pre power amplifier (PPA) 315, or a power amplifier (PA) 316.

In accordance with various embodiments, the wireless communication circuit 300 can convert RF signals of a millimeter wave band received via many antennas (e.g., the antenna module 197 of FIG. 1) into IF signals of an intermediate frequency band, and forward to an RF stage (e.g., the communication module 190 or the wireless communication module 192 of FIG. 1) of a next stage, thereby receiving signals from an external electronic device (e.g., the electronic device 102) or a base station. For further example, the wireless communication circuit 300 can convert IF signals of an intermediate frequency band inputted from the RF stage (e.g., the communication module 190 or the wireless communication module 192 of FIG. 1) into RF signals of a millimeter wave band and thereafter, forward to an array antenna via at least one of the first transmission and/or reception sub circuit 310-0 to the sixteenth transmission and/or reception sub circuit 310-15, thereby transmitting signals to the external electronic device or the base station.

In accordance with various embodiments, the first transmission and/or reception sub circuit 310-0 to the sixteenth transmission and/or reception sub circuit 310-15 each can have a transmit (Tx) path and a receive (Rx) path for transmitting and receiving an ultra-high frequency wireless signal in a time division multiple access (TDAM) scheme. For example, the Tx path can include at least one of the PSDA 313, the PS 314, the PPA 315, or the PA 316. The Rx path can include at least one of the LNA 311 or the PS 312.

In accordance with various embodiments, the LNA 311 can amplify signals received via the many antennas. The LNA 311 can be disposed in a next stage of the many antennas, in order to minimize the attenuation of the signals on a transmission line. The LNA 311 can amplify the received signals to satisfy a minimal noise factor, thereby improving the entire system noise performance.

The PS 312 can receive a signal amplified through the LNA 311, and adjust a phase of the received signal. For example, in a 4-bit construction, the PS 312 can vary a phase of 0 to 360 degrees at intervals of 22.5 degrees by a total of sixteen states. In accordance with an embodiment, each PS 312 included in the transmission and/or reception sub circuits 310-0 to 310-15 can offer a phase variation of a set value in accordance with reception beamforming. For example, the processor 240 can transmit a control signal instructing a phase variation to a PS of a transmission and/or reception sub circuit connected to each antenna, thereby converting a direction of a receive beam.

The PSDA 313, an example of a driving amplifier, can be positioned in a transmission RF chain path of a multi-chain RF system for a phased array system. The PSDA 313 can perform an amplification function for compensating for a low gain of the PA 316, a loss provided by a power divider positioned in front/rear, and a loss provided by the phase shifter (PS) 314.

The PS 314 can perform a function of varying a phase of an inputted signal. For example, in a 4-bit construction, the PS 314 can vary a phase of 0 to 360 degrees at intervals of 22.5 degrees by a total of sixteen states. In accordance with an embodiment, each PS 314 included in the transmission and/or reception sub circuits 310-0 to 310-15 can offer a phase variation of a set value, thereby performing transmission beamforming. For example, the processor 240 can transmit a control signal instructing a phase variation to the PS 314 of the transmission and/or reception sub circuits 310-0 to 310-15 connected to the antennas, thereby converting a direction of a transmit beam.

The PPA 315 can be positioned in a front stage of the PA 316, and include an amplifier for varying an intensity of a signal offered to the PA 316. The PA 316 can include an amplifier positioned at a transmitter end stage and amplifying an RF signal, and minimizing the distortion of an output signal and maintaining a high efficiency characteristic. In accordance with various embodiments, a power level detecting circuit, such as a transmitter signal strength indicator (TSSI), can be embedded in an end stage of the PA 316.

In accordance with various embodiments, at least one of the first transmission and/or reception sub circuit 310-0 to the sixteenth transmission and/or reception sub circuit 310-15 can be connected to at least one antenna forming an array antenna. The antenna connected to the transmission and/or reception circuit 310 can be, for instance, a radiation element array (i.e., 4×4 radiation element array) antenna which includes sixteen radiation elements. In accordance with an embodiment, the antenna array can include many dipole antennas and many patch antennas. In accordance with an embodiment, the first transmission and/or reception sub circuit 310-0 to the sixteenth transmission and/or reception sub circuit 310-15 can be disposed in one surface of a printed circuitry board, and the many dipole antennas and the many patch antennas can be positioned in the other surface of the printed circuitry board.

In accordance with various embodiments, the number of the transmission and/or reception circuit 310 (e.g., the first transmission and/or reception sub circuit 310-0 to the sixteenth transmission and/or reception sub circuit 310-15) can be a number corresponding to the number of many antennas, for example, 16 corresponding to 16 antenna arrays respectively, thereby processing a transmitted and/or received signal by each antenna. In accordance with various embodiments, between the first transmission and/or reception sub circuit 310-0 to sixteen transmission and/or reception sub circuit 310-15 and the transmission and/or reception conversion switch 323 can be included the combiner 320a able to be implemented as, for example, a 16-way combiner/divider for combining signals received via respective receive path of the first transmission and/or reception sub circuit 310-0 to the sixteenth transmission and/or reception sub circuit 310-05 into one received signal. In accordance with various embodiments, between the first transmission and/or reception sub circuit 310-0 to sixteen transmission and/or reception sub circuit 310-15 and the transmission and/or reception conversion switch 323 can be included the divider 320b able to be implemented as, for example, a 16-way combiner/divider for dividing one transmitted signal into many transmitted signals according to respective transmit paths of the first transmission and/or reception sub circuit 310-0 to the sixteen transmission and/or reception sub circuit 310-15.

In accordance with various embodiments, the transmission and/or reception circuit 310 (e.g., the first transmission and/or reception sub circuit 310-0 to the sixteenth transmission and/or reception circuit 310-15) can include the PA 316 for amplifying a transmitted signal, the PS 314 for varying a phase of the transmitted signal for the sake of transmission beamforming, the LNA 311 for amplifying a received signal, or the PS 312 for varying a phase of the received signal for the sake of reception beamforming.

In accordance with various embodiments, in the wireless communication circuit 300, a construction, and an installation position, of an amplification stage for amplifying a transmitted and received signal can be various. In accordance with various embodiments, the wireless communication circuit 300 can further include a filter for filtering each of a transmitted signal and a received signal, etc.

In accordance with various embodiments, the wireless communication circuit 300 can include a frequency up/down converter for up converting a transmitted signal (for example, an IF signal) transmitted from the communication module 250 into a wireless signal (for example, an RF signal) of an ultra-high frequency band, or frequency down converting a received signal of the ultra-high frequency band into an IF signal. For example, the frequency up/down converter can include the local oscillator 325, the reception mixer 322a, or the transmission mixer 322b, etc. According to various embodiments, in response to the communication module 250 being formed to provide and transmit a signal of an ultra-high frequency band for wireless transmission, the wireless communication circuit 300 may not include the frequency up/down converter.

According to various embodiments, the local oscillator 325 can be formed to provide a local signal in itself as well, but can be formed to, for the sake of signal synchronization, provide the local signal by using (for example, frequency multiplying) a reference local signal transmitted from the communication module 250. For example, an IF signal can be 11.x GHz (e.g., 11.2 GHz), and the reference local signal can be 5.x GHz (e.g., 5.6 GHz), and the local oscillator 325 can provide a local signal (e.g., 16.8 GHz) 3-times multiplying the reference local signal to provide a wirelessly transmitted ultra-high frequency signal (e.g., 28 GHz). For example, in response to up converting an IF signal into an RF signal, the provided signal can correspond to a frequency (e.g., 16.8 GHz) 3-times multiplying a reference frequency (e.g., 5.6 GHz). The local oscillator 325 can transmit the provided signal to the transmission mixer 322b, thereby up converting a frequency (e.g., 11.2 GHz) of the IF signal. A frequency of the frequency-up converted RF signal can be 28 GHz which is a sum of a frequency 3-times multiplied to the frequency of the IF signal. For another example, the local oscillator 325 can offer a reference local signal or a local signal frequency-multiplying the reference local signal to the reception mixer 322a, thereby providing an IF signal of an intermediate frequency band from an RF signal of an ultra-high frequency band. The reference local signal, for example, can be a signal corresponding to a frequency band of 4 GHz to 8 GHz. The IF signal, for example, can be a signal corresponding to a frequency band of 8 GHz to 14 GHz. The RF signal, for example, can be a signal corresponding to a frequency band of GHz to 60 GHz.

According to various embodiments, the wireless communication circuit 300 can include a controller (not shown) for controlling an operation of the wireless communication circuit 300. The controller (not shown) can perform transmission and/or reception switching control and transmission and/or reception beamforming control of the wireless communication circuit 300. In accordance with various embodiments, the controller (not shown) can be formed to receive a control signal from the processor 240.

According to various embodiments, a signal offered from the transmitter and/or receiver to the wireless communication circuit 300 can include an IF signal, a reference local signal, and a control signal. For example, the IF signal, the reference local signal, and the control signal each can be a signal transmitted on a different frequency band. The IF signal, the reference local signal, and the control signal can be offered as a frequency signal combined through the connection member (e.g., a coaxial cable or an FPCB). In accordance with an embodiment, the wireless communication circuit 300 can include the signal divider 327 of a filter combiner/divider structure for separating a frequency-combined signal offered from the communication module 250 into respective IF signal, reference local signal, and/or control signal. For example, in response to the IF signal being 11.2 GHz, and the reference local signal being 5.6 GHz, the control signal can be designed by 2 GHz or less. The signal divider 327, for example, can include a triplexer for frequency dividing/combining an IF signal, a reference local signal, and a control signal, and can be formed including a plurality of filters (for instance, a low pass filter, a high pass filter, a band pass filter, etc.) as well.

Figure 4:
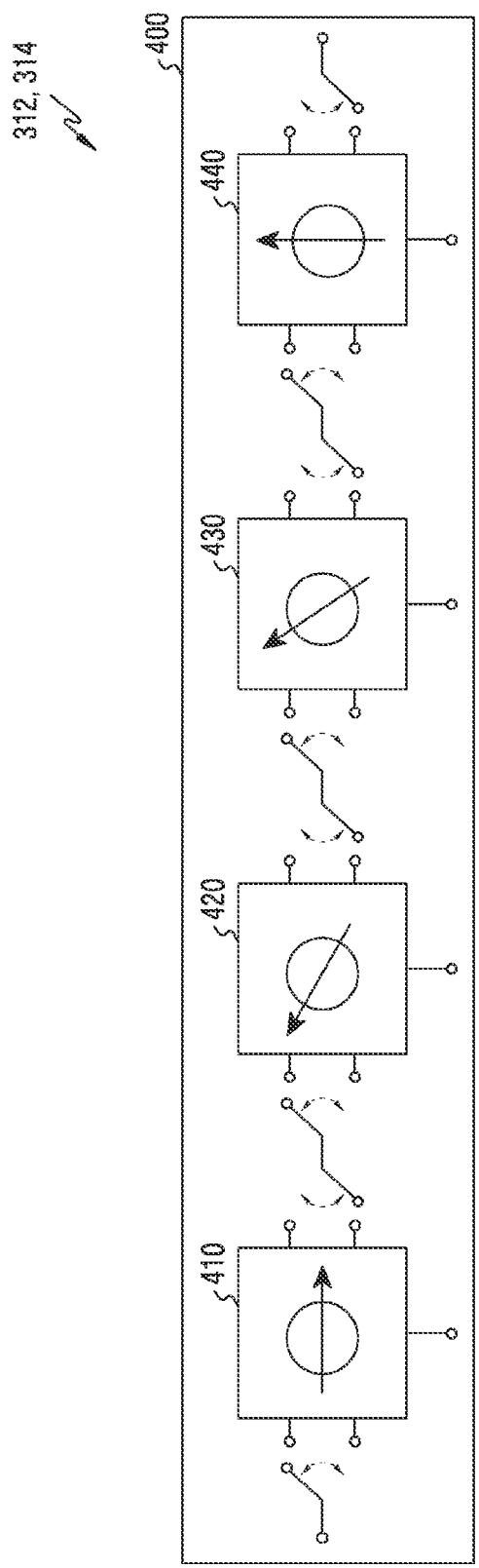
FIG. 4 illustrates a circuit diagram representing a detailed structure of a PS according to various embodiments of the present disclosure.

FIG. 4 is a circuit diagram representing a detailed structure of a PS according to various embodiments of the present disclosure.

The PS 400 of FIG. 4 can correspond to at least one of a first transmission PS 314-1 or a first reception PS 312-1 illustrated in FIG. 3.

Referring to FIG. 4, the PS 400 can include a plurality of PS elements 410 to 440. In an embodiment, the PS 400 can be included in one transmission and/or reception sub circuit. For example, the PS 400 can be included in the first transmission and/or reception sub circuit 310-0, and at this time, the PS 400 can be the first transmission PS 314-1 or the first reception PS 312-1.

In an embodiment, in response to 22.5 degrees being set to the PS 400, the PS 400 can convert a phase of an input signal into 22.5 degrees, and output a signal having the converted phase, and the signal having the varied phase can be transmitted in the form of a directional beam from an antenna element corresponding to the PS 400. For example, in response to the PS 400 being the first transmission PS 314-1, and 22.5 degrees being set to the first transmission PS 314-1, a signal whose phase is converted into 22.5 degrees by the transmission PS 314-1 can be amplified by the first PPA 315-1 and the first PA 316-1 and thereafter, be transmitted in the form of a directional beam from an antenna element connected to the first transmission and/or reception sub circuit 310-0.

According to various embodiments, the number of the plurality of PS elements 410 to 440 can be determined according to a bit construction of the PS 400. For example, as disclosed in FIG. 4, in response to the PS 400 being a 4-bit construction, the PS 400 can include four PS elements 410 to 440. For another example, in response to the PS 400 being a 5-bit construction, the PS 400 can include five PS elements (not shown).

According to various embodiments, the plurality of PS elements 410 to 440 can correspond to specified angles. For example, in response to the PS 400 being a 4-bit construction, the first PS element 410 can correspond to 180 degrees, and the second PS element 420 can correspond to 22.5 degrees, and the third PS element 430 can correspond to 45 degrees, and the fourth PS element 440 can correspond to 90 degrees. In an embodiment, the plurality of PS elements 410 to 440 can correspond to 180 degrees, 22.5 degrees, 45 degrees, and 90 degrees according to a flow direction of a signal, but this is merely one implementation example, and does not limit the scope of rights. For example, the first PS element 410 can correspond to 22.5 degrees, the second PS element 420 can do to 45 degrees, the third PS element 430 can do to 90 degrees, or the fourth PS element 440 can do to 180 degrees.

According to various embodiments, the PS 400 can perform a function of varying a phase of an inputted signal, and a value varying the phase can be determined based on the number of a plurality of PS elements. In response to the number of the plurality of PS elements being an N number, the phase variation value can exist as much as the number of a $2^N$ number. For example, as disclosed in FIG. 4, in a 4-bit construction, the PS 400 can vary a phase of 0 to 337.5 degrees at intervals of 22.5 degrees by a total of 16 phases. The phase varied by the PS 400 can correspond to a phase of a directional beam transmitted from an antenna element corresponding to the PS 400. Although not illustrated in FIG. 4, in a 5-bit construction, the PS 400 can vary a phase of 0 to 348.75 degrees at intervals of 11.25 degrees by a total of 32 phases.

According to various embodiments, the PS 400 can receive, from the communication module 250 or a controller (not shown), a command for activation (or applying or non-applying) of the plurality of PS elements 410 to 440. In an embodiment, in response to the PS 400 being the 4-bit construction, the PS 400 can receive a command formed with a 4-dimension bit string. For example, the PS 400 can receive a command formed with a 4-dimension bit string [0, 0, 1, 1]. The dimension of the bit string can correspond to the number of the plurality of PS elements 410 to 440. For another example, in response to the PS 400 being the 5-bit construction, the PS 400 can receive a command formed with a 5-dimension bit string [0, 1, 0, 1, 0].

According to various embodiments, the PS 400 can vary a phase of an inputted signal, by using at least one of the plurality of PS elements 410 to 440, on the basis of the inputted command. For example, in response to the PS 400 being the 4-bit construction, and receiving a command formed with a 4-dimension bit string [0, 0, 1, 1], the PS 400 can inactivate the first PS element 410 and the second PS element 420, and activate the third PS element 430 and the fourth PS element 440, thereby varying a phase of an inputted signal by 135 degrees (45 degrees+90 degrees). For another example, in response the PS 400 being the 5-bit construction, and including a first PS element (not shown, 180 degrees), a second PS element (not shown, 12.25 degrees), a third PS element (not shown, 22.5 degrees), a fourth PS element (not shown, 45 degrees), and a fifth PS element (not shown, 90 degrees), and receiving a command configured with a 5-dimension bit string [0, 1, 0, 1, 0], the PS 400 can activate only the second PS element (not shown) and the fourth PS element (not shown), thereby changing a phase of an inputted signal by 57.25 degrees (12.25 degrees+45 degrees).

TABLE 1

|  | first PS element (410) | second PS element (420) | third PS element (430) | fourth PS element (440) |
| --- | --- | --- | --- | --- |
| 0 degree | 0 | 0 | 0 | 0 |
| 22.5 degrees | 0 | 1 | 0 | 0 |
| 45 degrees | 0 | 0 | 1 | 0 |
| 67.5 degrees | 0 | 1 | 1 | 0 |
| 90 degrees | 0 | 0 | 0 | 1 |
| 112.5 degrees | 0 | 1 | 0 | 1 |
| 135 degrees | 0 | 0 | 1 | 1 |
| 157.5 degrees | 0 | 1 | 1 | 1 |
| 180 degrees | 1 | 0 | 0 | 0 |
| 202.5 degrees | 1 | 1 | 0 | 0 |
| 225 degrees | 1 | 0 | 1 | 0 |
| 247.5 degrees | 1 | 1 | 1 | 0 |
| 270 degrees | 1 | 0 | 0 | 1 |
| 292.5 degrees | 1 | 1 | 0 | 1 |
| 315 degrees | 1 | 0 | 1 | 1 |
| 337.5 degrees | 1 | 1 | 1 | 1 |

Table 1 shows 4-dimension bit strings corresponding to possible 16 phases (0 degree to 337.5 degrees). As shown in Table 1, one of 16 phases divided at intervals of 22.5 degrees from 0 degree to 337.5 degrees can correspond to a specific 4-dimension bit string. For example, a phase of 67.5 degrees can correspond to a 4-dimension bit string [0, 1, 1, 0], and a phase of 135 degrees can correspond to a 4-dimension bit string [0, 0, 1, 1]. Accordingly to this, in response to receiving a command formed with the 4-dimension bit string, the PS 400 can control the activation or inactivation of the plurality of PS elements 410 to 440 according to the received command, thereby changing a phase of an inputted signal.

In an embodiment, the activation or inactivation of each of the plurality of PS elements 410 to 440 can be implemented in a switching scheme. For example, in response to control information including a 4-dimension bit string [0, 1, 1, 0], the PS 400 can switch wherein the first PS element 410 and the fourth PS element 440 are bypassed, and the second PS element 420 and the third PS element 430 are activated. An output signal can be more delayed by a phase of 67.5 degrees than an input signal and be outputted. For another example, in response to the control information including the 4-dimension bit string [0, 1, 0, 1], the PS 400 can switch wherein the first PS element 410 and the third PS element 430 are bypassed, and the second PS element 420 and the fourth PS element 440 are activated. An output signal can be more delayed by a phase of 112.5 degrees than an input signal and be outputted.

Figure 5:
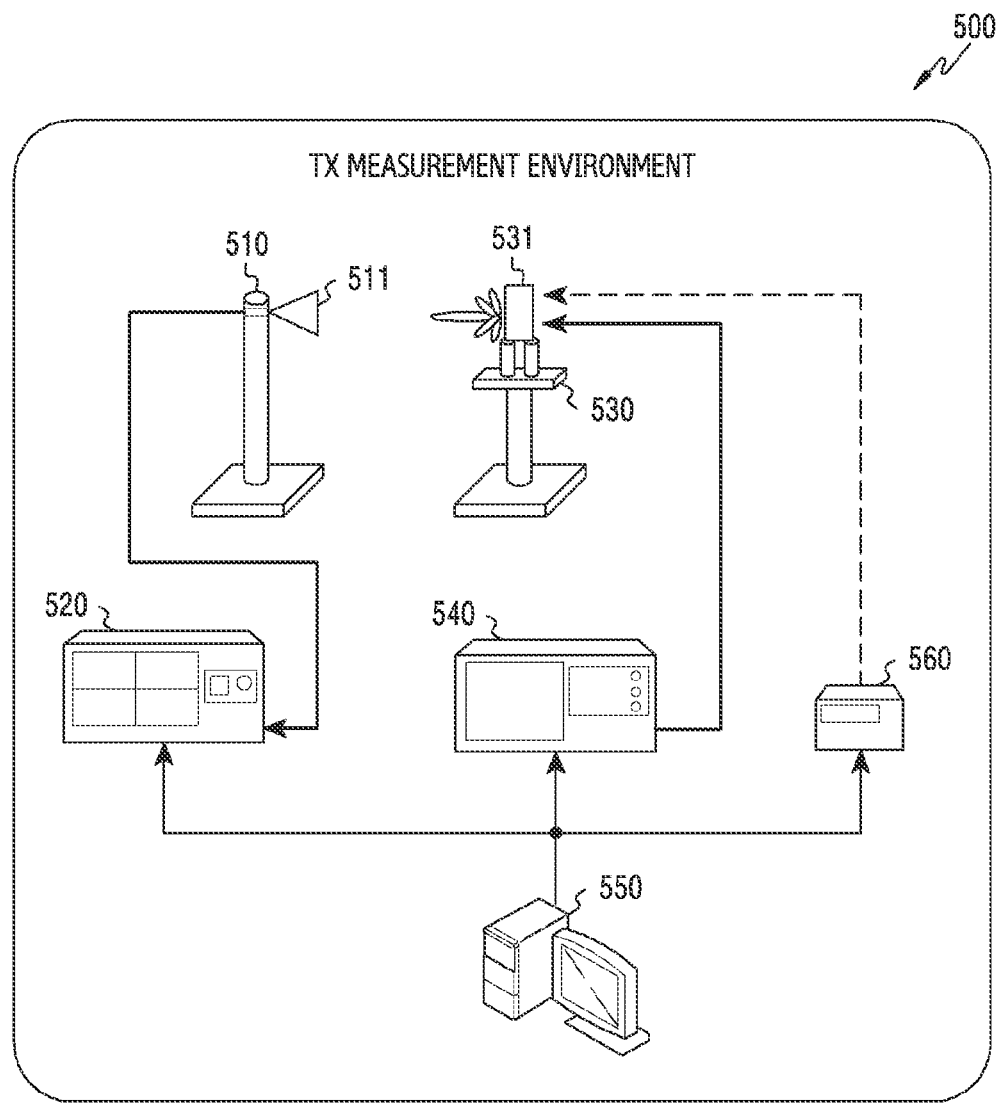
FIG. 5 is a diagram for explaining a Tx measurement environment for identifying a characteristic related to a quality of a wireless communication device according to various embodiments of the present disclosure.

FIG. 5 is a diagram for explaining a Tx measurement environment for identifying a characteristic related to a quality of a wireless communication device according to various embodiments of the present disclosure.

In an embodiment, the wireless communication device 531 can be the wireless communication device 260 of FIG. 2B.

According to an embodiment, the TX measurement environment 500 for identifying a characteristic of the wireless communication device 531 can include at least one of a PC 550, a signal provider 540, a signal analyzer 520, or a power supply 560.

According to various embodiments, the wireless communication device 531 of a module form can be fixed to a first rack 530. A signal detecting device 511 can be fixed to a second rack 510. For example, the signal detecting device 511 can include a horn antenna. According to an embodiment, in response to the wireless communication device 531 being fixed to the first rack 530, the signal detecting device 511 can be positioned to face a direction (e.g., in response to a phase of the PS 400 being 0 degree) of a basic beam of the wireless communication device 531.

According to various embodiments, in the TX measurement environment 500, a control signal provided through the PC 550 can be transmitted to the signal provider 540 and, on the basis of the control signal transmitted from the PC 550, the signal provider 540 can provide a corresponding RF signal or IF signal. The RF signal or IF signal provided by the signal provider 540 can be offered to the wireless communication device 531 mounted on the first rack 530. The wireless communication device 531 can include an antenna array (e.g., the first antenna array 280 or second antenna array 285) including a plurality of antenna elements and, can transmit the RF signal or IF signal offered from the signal provider 540, on the air (OTA) through the antenna array.

According to various embodiments, the signal detecting device 511 fixed to the second rack 510 can receive an RF signal transmitted from the wireless communication device 531, and the RF signal received from the signal detecting device 511 can be offered to the signal analyzer 520. The signal analyzer 520 can analyze the RF signal received through the signal detecting device 511, thereby testing or identifying whether the wireless communication device 531 is normally operated. For example, the signal analyzer 520 can determine a signal intensity (e.g., an equivalent isotropic radiated power (EIRP)) of a received RF signal, and determine power of the RF signal on the basis of the determined signal intensity. In an embodiment, the unit of the EIRP can be dBm.

The signal analyzer 520 or the PC 550 can identify a characteristic of the wireless communication device 531 on the basis of power of an RF signal. In an embodiment, the signal analyzer 520 or the PC 550 can identify a characteristic related to a quality of the wireless communication device 531. For example, the signal analyzer 520 or the PC 550 can determine the wireless communication device 531 as faulty or normal.

According to various embodiments, the PC 550 can include an antenna configured to receive wireless signals outputted from a first antenna and a second antenna which are included in an external electronic device (e.g., the wireless communication device 531). The antenna configured to receive the wireless signals outputted from the external electronic device can correspond to the signal detecting device 511.

According to various embodiments, the PC 550 can include a communication circuit electrically connected to the antenna configured to receive the wireless signals. The communication circuit can, referring to FIG. 5, correspond to the signal analyzer 520.

According to various embodiments, the PC 550 can include a control circuit electrically connected to the antenna and the communication circuit. The control circuit included in the PC 550 can be configured to control the external electronic device wherein the external electronic device outputs specified wireless signals at a first specified phase by using the first antenna and a second specified phase by using the second antenna, and receive the specified wireless signals by using the antenna, and identify signal intensities corresponding to the specified wireless signals by using the communication circuit, and determine a status related to the external electronic device, based at least on a difference value between the specified signal intensities and a reference signal intensity.

Figure 6A:
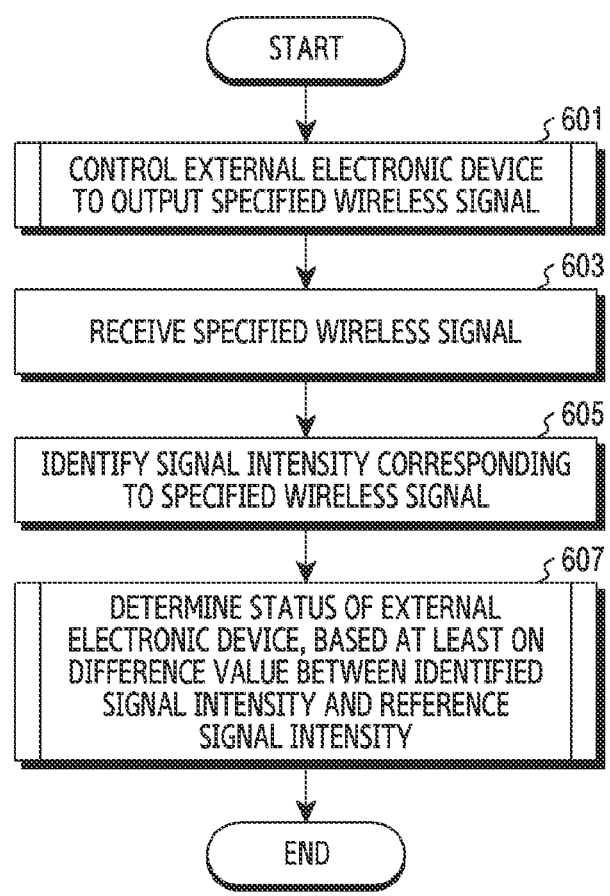
FIG. 6A illustrates a flowchart for identifying whether an external electronic device is normally operated according to various embodiments of the present disclosure.

FIG. 6A illustrates a flowchart for identifying whether a wireless communication device is normally operated according to various embodiments of the present disclosure.

An external electronic device of FIG. 6A can correspond to the wireless communication device 260 of FIG. 2B, and an electronic device can correspond to the PC 550 of FIG. 5.

Referring to FIG. 6A, in operation 601, a processor of the electronic device 550 can control the external electronic device 260 to output a specified wireless signal.

In accordance with an embodiment, the processor of the electronic device 550 can transmit a control signal instructing to output a specified wireless signal to the external electronic device 260. For example, the processor of the electronic device 550 can receive data from a physical port included in the connection terminal 178, thereby identifying that the processor of the electronic device 550 and the external electronic device 260 are wiredly connected. The processor of the electronic device 550 can transmit the control signal instructing to provide the specified wireless signal to the external electronic device 260 through the physical port. For another example, the processor of the electronic device 550 can obtain a discovery signal transmitted from the external electronic device 260, and establish connection wirelessly with the external electronic device 260. The processor of the electronic device 550 can transmit, on the air (OTA), the control signal instructing to provide the specified wireless signal to the external electronic device 260.

In accordance with an embodiment, the control signal can include information indicating phases of a plurality of antennas included in the external electronic device 260. The plurality of antennas can include at least one first antenna and at least one second antenna. For example, referring to FIG. 6B, the external electronic device 260 can include a 1×4 antenna array, and the at least one first antenna can include an antenna 1 610 to an antenna 3 620, and the at least one second antenna can include an antenna 4 625. The control signal can include information instructing the antenna 1 610 to the antenna 3 620 to output a signal corresponding to a first phase (e.g., 0 degree), and the antenna 4 625 to output a signal corresponding to a second phase (e.g., 180 degrees). For example, in response to the antenna 1 610 to the antenna 3 620 being delayed by a phase of 0 degree, and the antenna 4 625 being delayed by a phase of 180 degrees, the processor of the electronic device 550 may not transmit control information to the antenna 1 610 to the antenna 3 620. The processor of the electronic device 550 can transmit control information instructing to delay a phase by 180 degrees to the antenna 4 625.

In accordance with an embodiment, the control signal can include a bit corresponding to the number of a plurality of PS elements (e.g., the first PS element 410 to the fourth PS element 440). As illustrated in FIG. 4, when the PS 400 configuring a transmission RF chain includes four PS elements, control information can include information indicating four bits. Though not illustrated, when the PS configuring the transmission RF chain includes five PS elements, the control information can include information indicating five bits. For example, in response to a first phase corresponding to 0 degree, the control information can include a 4-dimension bit string [0, 0, 0, 0]. For another example, when the first PS element 410 corresponds to a PS element delaying a phase by 180 degrees, and the first phase corresponds to 180 degrees, the control information can include a 4-dimension bit string [1, 0, 0, 0]. For further example, when the control information instructs the antenna 1 610 to the antenna 3 620 to output a signal corresponding to a phase of 0 degree and the antenna 4 625 to output a signal corresponding to a phase of 180 degrees, the control information can include a bit string of [0000, 0000, 0000, 1000].

In accordance with an embodiment, a second phase can correspond to an antiphase to the first phase. For example, in response to the first phase corresponding to 0 degree, the second phase can correspond to 180 degrees (or −180 degrees). For another example, in response to the first phase corresponding to 22.5 degrees, the second phase can correspond to 202.5 degrees (or −157.5 degrees). The second phase corresponds to an antiphase relationship with the first phase, so signals provided from the antenna 1 610 to the antenna 3 620 on the basis of the first phase can form a destructive field with a signal provided from the antenna 4 625 on the basis of the second phase. However, an embodiment is not limited to this.

In accordance with an embodiment, the processor of the electronic device 550 can identify the at least one second antenna on the basis of information on the external electronic device 260. The processor of the electronic device 550 can acquire information on a model name of the external electronic device 260, an update version, etc. included in the external electronic device 260. The information on the external electronic device 260, in response to sensing a wireless or wired connection between the external electronic device 260 and the electronic device 550, can be transmitted from the external electronic device 260 to the electronic device 550. For another example, the processor of the electronic device 550 can receive a user input related to the information on the external electronic device 260, from a user. The processor of the electronic device 550 can identify the at least one second antenna by using mapping information previously stored in a memory.

TABLE 2

| Model name | Type | Antiphase antenna |
| --- | --- | --- |
| "A" | 1×4 | Antenna 4 |
| "B" | 4×4 | antenna 13 to antenna 16 |
| "C" | 2×4 | antenna 1 and antenna 2 |

Table 2 shows a mapping table included in the mapping information. As shown in Table 2, the processor of the electronic device 550 can identify at least one second antenna on the basis of information on the external electronic device 260. For example, in response to a model name of the external electronic device 260 being "A", the processor of the electronic device 550 can refer to the mapping table, thereby identifying that the external electronic device 260 includes the 1×4 antenna array, and outputs a signal in which a phase of the antenna 4 corresponds to an antiphase regarding remaining antennas (antennas 1 to 3) among a plurality of antennas. For another example, in response to the model name of the external electronic device 260 being "B", the processor of the electronic device 550 can refer to the mapping table, thereby identifying that the external electronic device 260 includes the 4×4 antenna array, and outputs a signal in which phases of the antenna 13 to antenna 16 correspond to antiphases regarding remaining antennas (antenna 1 to antenna 12) among the plurality of antennas. For further example, in response to the model name of the external electronic device 260 being "C", the processor of the electronic device 550 can refer to the mapping table, thereby identifying that the external electronic device 260 includes the 2×4 antenna array, and outputs a signal in which phases of the antenna 1 to antenna 2 correspond to antiphases regarding remaining antennas (antenna 3 to antenna 8) among the plurality of antennas.

In operation 603, the processor of the electronic device 550 can receive the specified wireless signal. The processor of the electronic device 550 can receive the specified wireless signal through the signal detecting unit 511. In accordance with an embodiment, a position of the signal detecting unit 511 can be changed on the basis of the control signal. For example, in response to the control signal indicating phase values of the antenna 1 610 to the antenna 4 625 by 0, 0, 0, and 180 respectively, the signal detecting unit 511 can be disposed in a direction of facing a rear surface of the housing 210. For another example, in response to the control signal indicating phase values of the antenna 1 610 to the antenna 4 625 by 0, 45, 90, and 135 respectively, the signal detecting unit 511 can be disposed in a direction of being inclined by 45 degrees from the rear surface of the housing 210.

In operation 605, the processor of the electronic device 550 can identify a signal intensity corresponding to the specified wireless signal. The processor of the electronic device 550 can measure a reception power of the specified wireless signal received through the signal detecting unit 511. The measured reception power can be proportional to the signal intensity. According to an embodiment, the signal intensity can be denoted as a received signal strength (RSS), etc. According to an embodiment, the signal intensity can be expressed with a value of the unit of dBm.

In operation 607, the processor of the electronic device 550 can determine a status of the external electronic device 260, based at least on a difference value between the identified signal intensity and a reference signal intensity. In accordance with an embodiment, the processor of the electronic device 550 can identify the reference signal intensity. The reference signal intensity can denote a signal reception intensity for a reference signal. The reference signal can correspond to a signal previously determined on the basis of the specified wireless signal. For example, when the specified wireless signal is provided by the antenna 1 610 to the antenna 3 620 corresponding to a phase of 0 degree and/or the antenna 4 625 corresponding to a phase of 180 degrees, the reference signal can be a signal which is set wherein the antenna 1 610 to the antenna 4 625 correspond to the phase of 0 degree. For another example, when the specified wireless signal is provided by the antenna 1 610 to the antenna 3 620 corresponding to a phase of 22.5 degrees and/or the antenna 4 625 corresponding to a phase of 202.5 degrees (or −157.5 degrees), the reference signal can be a signal which is set wherein the antenna 1 610 to the antenna 4 625 correspond to the phase of 22.5 degrees.

TABLE 3

| Antenna Array | EIRP (dBm) |
|---|---|
| 1×4 | 10.42 |
| 2×4 | 13.41 |
| 4×4 | 16.40 |

Table 3 shows mapping information on a reference signal intensity. As shown in Table 3, the processor of the electronic device 550 can identify a reference signal intensity value for a corresponding antenna array, based on the mapping information on the reference signal intensity. For example, in response to the external electronic device 260 including the 1×4 antenna array, the processor of the electronic device 550 can identify that the reference signal intensity value is 10.42 dBm. For another example, in response to the external electronic device 260 including the 2×4 antenna array, the processor of the electronic device 550 can identify that the reference signal intensity value is 13.41 dBm. For further example, in response to the external electronic device 260 including the 4×4 antenna array, the processor of the electronic device 550 can identify that the reference signal intensity value is 16.40 dBm.

In accordance with an embodiment, the processor of the electronic device 550 can acquire the difference value. The processor of the electronic device 550 can minus a signal intensity of the specified wireless signal from the identified reference signal intensity, thereby acquiring the difference value. The reference signal intensity means a signal intensity of a signal that a plurality of antennas all output at the same phase, so it can have a greater value than that of the specified wireless signal. For example, when a control signal instructs the antenna 1 610 to the antenna 3 620 to output a signal corresponding to a phase of 0 degree, and the antenna 4 625 to output a signal corresponding to a phase of 180 degrees, a signal intensity of the specified wireless signal can have a value of 6.52 dBm. Referring to Table 3, a reference signal intensity for the 1×4 antenna array can have a value of 10.42 dBm. The processor of the electronic device 550 can subtract the signal intensity of the specified wireless signal from the reference signal intensity (10.42 dBm-6.52 dBm), and acquire a difference value of 3.9 dBm.

In accordance with an embodiment, the processor of the electronic device 550 can determine whether the external electronic device 260 is normally operated, based at least on the acquired difference value. The processor of the electronic device 550 can compare the acquired difference value and a threshold value, thereby determining whether the external electronic device 260 is normally operated. The processor of the electronic device 550 can compare the threshold value and the difference value, thereby identifying whether at least one of the plurality of antennas breaks down. For example, in response to the antenna 4 625 breaking down, a signal corresponding to the antiphase may not be outputted. Accordingly, a destructive field between many signals may not be formed. Because the destructive field is not formed between the many signals, the processor of the electronic device 550 can measure a signal intensity for a situation in which the antenna 4 625 is not operated.

TABLE 4

| Antenna array | Antiphase gain | Off gain | Antiphase difference | Off difference |
| --- | --- | --- | --- | --- |
| All on | 13.41 | 0 | 0 | 0 |
| Antenna 1 off | 11.3 | 13 | 2.11 | 0.41 |
| Antenna 2 off | 11 | 12.86 | 2.41 | 0.55 |
| Antenna 3 off | 10 | 12.45 | 3.41 | 0.96 |
| Antenna 4 off | 10.42 | 12.62 | 2.99 | 0.79 |
| Antenna 5 off | 10.77 | 12.77 | 2.64 | 0.64 |
| Antenna 6 off | 11.37 | 13.03 | 2.04 | 0.38 |
| Antenna 7 off | 11.46 | 13.07 | 1.95 | 0.34 |
| Antenna 8 off | 11.05 | 12.87 | 2.36 | 0.54 |

Table 4 shows a signal intensity dependent on normality or abnormality per each antenna in a 2×4 antenna array. Referring to Table 4, the external electronic device 260 can include the 2×4 antenna array. For example, in response to an antenna 1 to an antenna 8 all outputting a signal of the same phase, a signal intensity measurement value can be 13.41 dBm. In accordance with an embodiment, in response to the antenna 1 breaking down, the antenna 1 can be understood to be inactivated. For example, in response to controlling all the antenna 1 to the antenna 8 to output the signal of the same phase, the processor of the electronic device 550 can acquire a signal intensity value of 13 dBm. However, referring to a reference signal intensity value for when the antenna 1 to the antenna 8 output the signal of the same phase, it is 13.41 dBm, so a decrease of dB caused by the breakdown of the antenna 1 can be nothing but 0.41 dB. The 0.41 dB is within an error range capable of, at signal intensity measurement, being provided by a deterioration of a wireless channel and/or an inaccuracy of measurement equipment, so the processor of the electronic device 550 can be difficult to determine the breakdown or non-breakdown of at least one antenna, by simply only controlling the antenna 1 to the antenna 8 to output the signal of the same phase. For another example, the processor of the electronic device 550 can instruct the antenna 2 to the antenna 8 to output a signal of a first phase, and the antenna 1 to output a signal of a second phase corresponding to an antiphase with the first phase. In response to the antenna 1 being normally operated, a signal provided from the antenna 1 forms a destructive field with signals provided from the remaining antennas (the antenna 2 to the antenna 8), so a measured signal intensity can be predicted to be 11.3 dBm. However, in response to the antenna 1 being abnormally operated, the signal provided from the antenna 1 cannot form the destructive field with the signals provided from the remaining antennas (the antenna 2 to the antenna 8), so the measured signal intensity can have a greater value than the signal intensity value (e.g., 11.3 dBm) corresponding to when the destructive field is formed. Referring to Table 4, an off gain of the antenna 1 can have a value of 13 dBm. Despite controlling at least one of a plurality of antennas to output a signal corresponding to an antiphase, in response to a difference between a signal intensity for a specified wireless signal and a reference signal intensity not exceeding a predetermined value or more, the processor of the electronic device 550 can determine that the at least one of the plurality of antennas is abnormally operated. For another example, the processor of the electronic device 550 can instruct the antenna 2 to the antenna 8 to output a signal of a first phase, and the antenna 1 to output a signal of a second phase corresponding to an antiphase with the first phase. When the antenna 1 is normally operated whereas at least one of the antenna 2 to the antenna 8 is not normally operated, the signal of the second phase provided from the antenna 1 and the signal of the first phase provided from at least one of the antenna 2 to the antenna 8 can provide a destructive field. Accordingly, the processor of the electronic device 550 can predict that a measured signal intensity is 11.3 dBm. However, because the at least one of the antenna 2 to the antenna 8 is not normally operated, the number of signals having the first phase arriving at the signal measurement device 511 of FIG. 5 can be decreased. Accordingly, the measured signal intensity can have a smaller value than a signal intensity value (e.g., 11.3 dBm) of when all antennas (the antenna 1 to the antenna 8) are normally operated. Accordingly, when the difference value is not included within a previously specified range from a threshold value, the processor of the electronic device 550 can determine that at least one of antennas (the antenna 2 to the antenna 8) outputting the signal corresponding to the first phase is not normally operated. That is, the threshold value can be set as an arbitrary value in which a decreased signal intensity is greater than an error range by outputting a signal corresponding to an antiphase from the at least one of the plurality of antennas. For example, in response to the difference value being within the previously specified range from the threshold value, the processor of the electronic device 550 can determine whether the external electronic device 260 is normally operated. In response to the threshold value being 3 dB, the processor of the electronic device 550 can identify that, because being 3.9 dB, the acquired difference value is within the previously specified range from the threshold value, and determine the external electronic device 260 as normal. For another example, in response to the difference value escaping the previously specified range from the threshold value, the processor of the electronic device 550 can determine whether the external electronic device 260 is operated as faulty. In response to the signal intensity of the specified wireless signal being 9.42 dBm, the processor of the electronic device 550 can identify that, because being nothing but 1 dB, the acquired difference value is less than the threshold value, and determine the external electronic device 260 as faulty.

In various embodiments, the previously specified range can be determined on the basis of the number of antennas included in the antenna array. For example, in a 1×4 antenna array, a change of dB caused by a faulty operation of one of four antennas can have a large value. For another example, in a 4×4 antenna array, a change of dB caused by a faulty operation of one of sixteen antennas can have a small value. Accordingly, the previously specified range can be determined based on the number of the antennas included in the antenna array.

In accordance with an embodiment, the threshold value can be determined based on the number of a plurality of antennas and control information. For example, the threshold value can be 3 dB, on the basis of control information instructing only one of four antennas to have an antiphase with remaining antennas in a 1×4 antenna array. For another example, the threshold value can be 6 dB, on the basis of control information instructing two of four antennas to provide a signal corresponding to a first phase and the remaining two antennas to provide a signal corresponding to a second phase that is in an antiphase relationship with the first phase in the 1×4 antenna array.

Figure 6B:
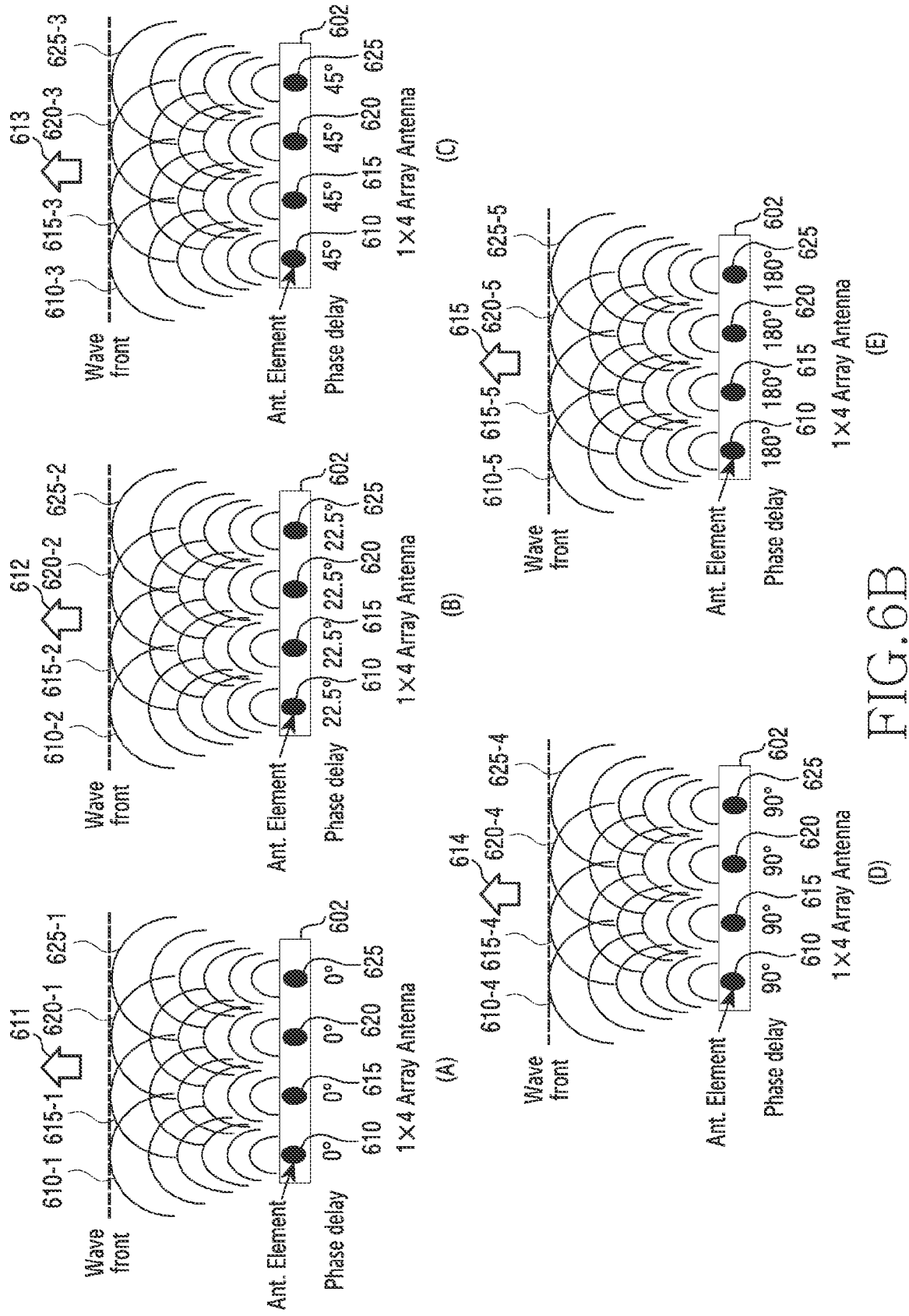
FIG. 6B is a diagram for explaining a plurality of beamforming operations necessary for identifying whether a wireless communication device is normally operated according to various embodiments of the present disclosure.

FIG. 6B is a diagram for explaining a plurality of beamforming operations necessary for identifying whether an external electronic device is normally operated according to various embodiments of the present disclosure. The external electronic device of FIG. 6B can correspond to the wireless communication device 260 of FIG. 2B.

Referring to FIG. 6B (a) to (e), the external electronic device (e.g., the wireless communication device 260 of FIG. 2B) can include an antenna array 602 (e.g., the first antenna array 280 or the second antenna array 285).

In an embodiment, the antenna array 602 can include two or more antenna elements. Referring to FIG. 6B (a) to FIG. 6B (e), the antenna array 602 can include a first antenna element 610 to a fourth antenna element 625.

In an embodiment, the antenna array 602 can form a beam in a specific direction by using the two or more antenna elements included in the antenna array 602. For example, the antenna array 602 can form a beam (e.g., the beam 611) going in a first direction, by using the first antenna element 610 to the fourth antenna element 625.

In an embodiment, the first antenna element 610 to the fourth antenna element 625 included in the antenna array 602 can transmit directional signals corresponding to a phase delay of a specified angle. In an embodiment, the phase delay can be an angle which is set to a transmission PS of a transmission and/or reception sub circuit connected to the antenna element. For example, in response to 0 degree being set to the first transmission PS 314-1 of the first transmission and/or reception sub circuit 310-0 connected to the first antenna element 610, the first antenna element 610 can transmit a directional signal having the same phase as an input signal inputted to the first transmission PS 314-1. For another example, in response to 22.5 degrees being set to the second transmission PS 314-2 of the second transmission and/or reception sub circuit 310-1 connected to the second antenna element 615, the second antenna element 615 can transmit a directional signal having a phase more delayed by 22.5 degrees than an input signal inputted to the second transmission PS 314-2.

In an embodiment, the antenna elements 610 to 625 included in the antenna array 602 can transmit directional signals (e.g., 610-1 to 625-1, 610-2 to 625-2, 610-3 to 625-3, 610-4 to 625-4, and 610-5 to 625-5) corresponding to a phase delay of the same angle.

Referring to FIG. 6B (a) to (e), the antenna elements 610 to 625 included in the antenna array 602 can transmit directional signals corresponding to phase delays of 0 degree, 22.5 degrees, 45 degrees, 90 degrees, and 180 degrees. For example, FIG. 6B (a) shows an example in which all the antenna elements 610 to 625 transmit first directional signals 610-1 to 625-1 corresponding to a phase delay of 0 degree, and FIG. 6B (b) does in which all the antenna elements 610 to 625 transmit second directional signals 610-2 to 625-2 corresponding to a phase delay of 22.5 degrees, and FIG. 6B (c) does in which all the antenna elements 610 to 625 transmit third directional signals 610-3 to 625-3 corresponding to a phase delay of 45 degrees, and FIG. 6B (d) does in which all the antenna elements 610 to 625 transmit fourth directional signals 610-4 to 625-4 corresponding to a phase delay of 90 degrees, and FIG. 6B (e) does in which all the antenna elements 610 to 625 transmit fifth directional signals 610-5 to 625-5 corresponding to a phase delay of 180 degrees.

In an embodiment, the external electronic device 260 can control the antenna elements 610 to 625 included in the antenna array 602 to transmit directional signals corresponding to a phase delay of the same angle, thereby forming a beam going in the same direction (e.g., a first direction). Referring to FIG. 6B (a), the external electronic device 260 can control all the antenna elements 610 to 625 included in the antenna array 602 to transmit the first directional signals 610-1 to 625-1 corresponding to the phase delay of 0 degree, thereby forming a first beam 611 going in the first direction.

Referring to FIG. 6B (b), the external electronic device 260 can control all the antenna elements 610 to 625 included in the antenna array 602 to transmit the second directional signals 610-2 to 625-2 corresponding to the phase delay of 22.5 degree, thereby forming a second beam 612 going in the first direction. Referring to FIG. 6B (c) to (e), the external electronic device 260 can control all the antenna elements 610 to 625 included in the antenna array 602 to transmit the third directional signals 610-3 to 625-3 to the fifth directional signals 610-5 to 625-5, thereby forming a third beam 613 to a fifth beam 615 going in the first direction.

Referring to FIG. 6B (a) to (e), one can identify the fact that, when all the antenna elements included in the antenna array 602 transmit directional signals corresponding to a phase delay of the same angle, a direction of a beam formed by the external electronic device 260 is irrelevant to a phase delay value. For example, referring to FIG. 6B (a), when all the antenna elements 610 to 625 included in the antenna array 602 transmit the first directional signals 610-1 to 625-1 corresponding to the phase delay of 0 degree, the first beam 611 can be formed in the first direction and, referring to FIG. 6B (b), even when all the antenna elements 610 to 625 included in the antenna array 602 transmit the second directional signals 610-2 to 625-2 corresponding to the phase delay of 22.5 degrees, the second beam 612 can be formed in the first direction.

Referring to FIG. 6B (c) to (e), when all the antenna elements 610 to 625 included in the antenna array 602 transmit the third directional signals 610-3 to 625-3 to the fifth directional signals 610-5 to 625-5 corresponding to the same phase delay (e.g., degrees, 90 degrees, and 180 degrees), the third beam 613 to the fifth beam 615 can be formed in the first direction.

The fact that, when all the antenna elements (e.g., the first antenna element 610 to the fourth antenna element 625) transmit directional signals (e.g., the first directional signals 610-1 to 625-1) corresponding to the same phase delay (e.g., 0 degree), a direction (e.g., the first direction) of a formed beam (e.g., the first beam 611) is identical, can mean the fact that there is no need to change a position of a signal detecting device (e.g., the signal detecting device 511-1 of FIG. 5A) every time, in checking whether the external electronic device 260 is normally operated. For example, in response to controlling transmission PSs (e.g., the first transmission PS 314-1 to the fourth transmission PS 314-4) corresponding to all the antenna elements 610 to 625 wherein all the antenna elements 610 to 625 transmit the directional signals corresponding to the same phase delay, but changing a value of a phase delay according to specified setting, one can identify whether the external electronic device 260 is normally operated even by only a simple construction and the minimal number of times (e.g., 5 times).

Figure 7A:
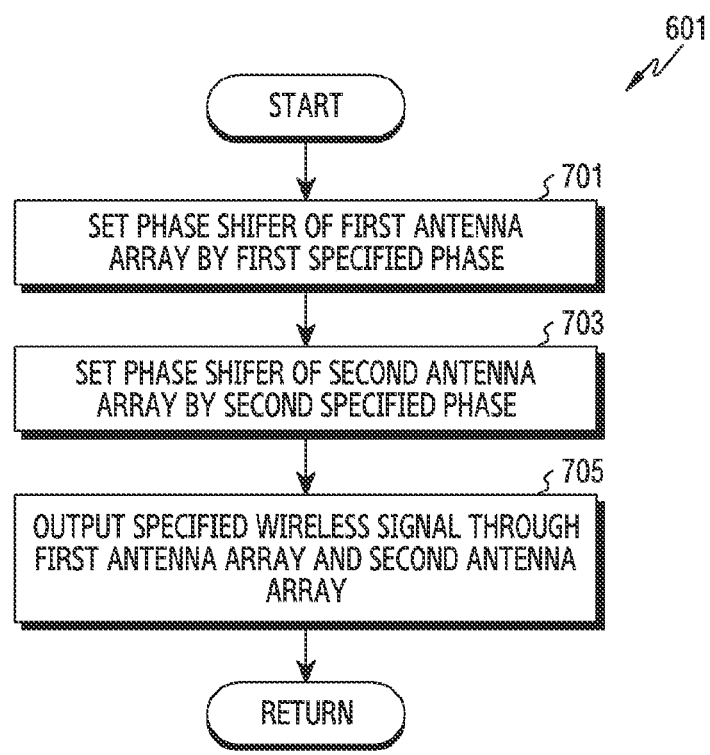
FIG. 7A illustrates a detailed flowchart for outputting a specified wireless signal according to various embodiments of the present disclosure.

FIG. 7A illustrates a flowchart for outputting a specified wireless signal according to various embodiments of the present disclosure. An external electronic device of FIG. 7A can correspond to the wireless communication device 260 of FIG. 2B, and an electronic device can correspond to the PC 550 of FIG. 5A.

Referring to FIG. 7A, in operation 701, a processor of the electronic device 550 can configure a phase shifter of the first antenna array 280 by a first specified phase. The processor of the electronic device 550 can transmit control information instructing to change a phase of the first antenna array 280 into the first specified phase to the wireless communication circuit 270 included in the external electronic device 260. According to an embodiment, the external electronic device 260 can include a 1×4 antenna array. The first antenna array 280 can include at least one antenna among the 1×4 antenna array. For example, referring to FIG. 7B, the first antenna array can include an antenna 1 710 to an antenna 3 730. The processor of the electronic device 550 can transmit control information instructing to output a signal corresponding to the first specified phase to the antenna 1 710 to the antenna 3 730. The antenna 1 710 to the antenna 3 730 can output a signal corresponding to a phase of 0 degree. For another example, the control information transmitted to each of the antenna 1 710 to the antenna 3 730 can include a 4-dimension bit string [0, 0, 0, 0].

Figure 7B:
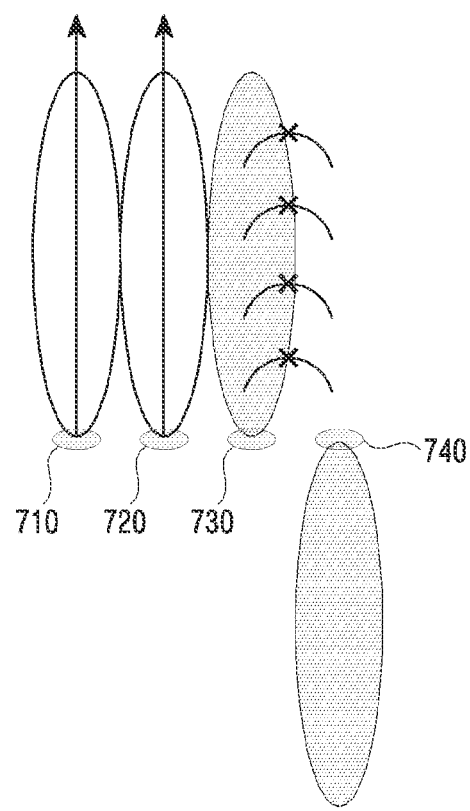
FIG. 7B illustrates an example of outputting an antiphase signal according to various embodiments of the present disclosure.

In operation 703, the processor of the electronic device 550 can configure a phase shifter of the second antenna array 285 by a second specified phase. The processor of the electronic device 550 can transmit control information instructing to change a phase of the second antenna array 285 into the second specified phase to the wireless communication circuit 270 included in the external electronic device 260. The second antenna array 285 can include remaining antennas excepting the first antenna array 280 among the 1×4 antenna array. For example, when the first antenna array 280 includes the antenna 1 710 to the antenna 3 730, the second antenna array 285 can include an antenna 4 740. The processor of the electronic device 550 can transmit control information instructing to output a signal corresponding to the second specified phase to the antenna 4 740. The second specified phase can be an antiphase to the first specified phase. For example, in response to the first specified phase being 0 degree, the second specified phase can be 180 degrees. For another example, in response to the first specified phase being 22.5 degrees, the second specified phase can correspond to 202.5 degrees. Referring to FIG. 7B, the antenna 4 740 can output a signal corresponding to a phase of 180 degrees. For another example, the control information transmitted to the antenna 4 740 can include a 4-dimension bit string [1, 0, 0, 0].

In operation 705, the processor of the electronic device 550 can control to output a specified wireless signal through the first antenna array 280 and the second antenna array 285. For example, referring to FIG. 7B, the antenna 1 710 to the antenna 3 730 can output a signal corresponding to a phase of 0 degree (i.e., the same phase as a phase of an input signal), and the antenna 4 740 can output a signal corresponding to a phase of 180 degrees (i.e., an opposite phase to the phase of the input signal). In accordance with an embodiment, because corresponding to a mutual antiphase relationship, the signal outputted from the antenna 3 730 and the signal outputted from the antenna 4 740 can be canceled. Accordingly, the specified wireless signal can be provided based on the signals outputted from the antenna 1 710 and the antenna 2 720.

Figure 8A:
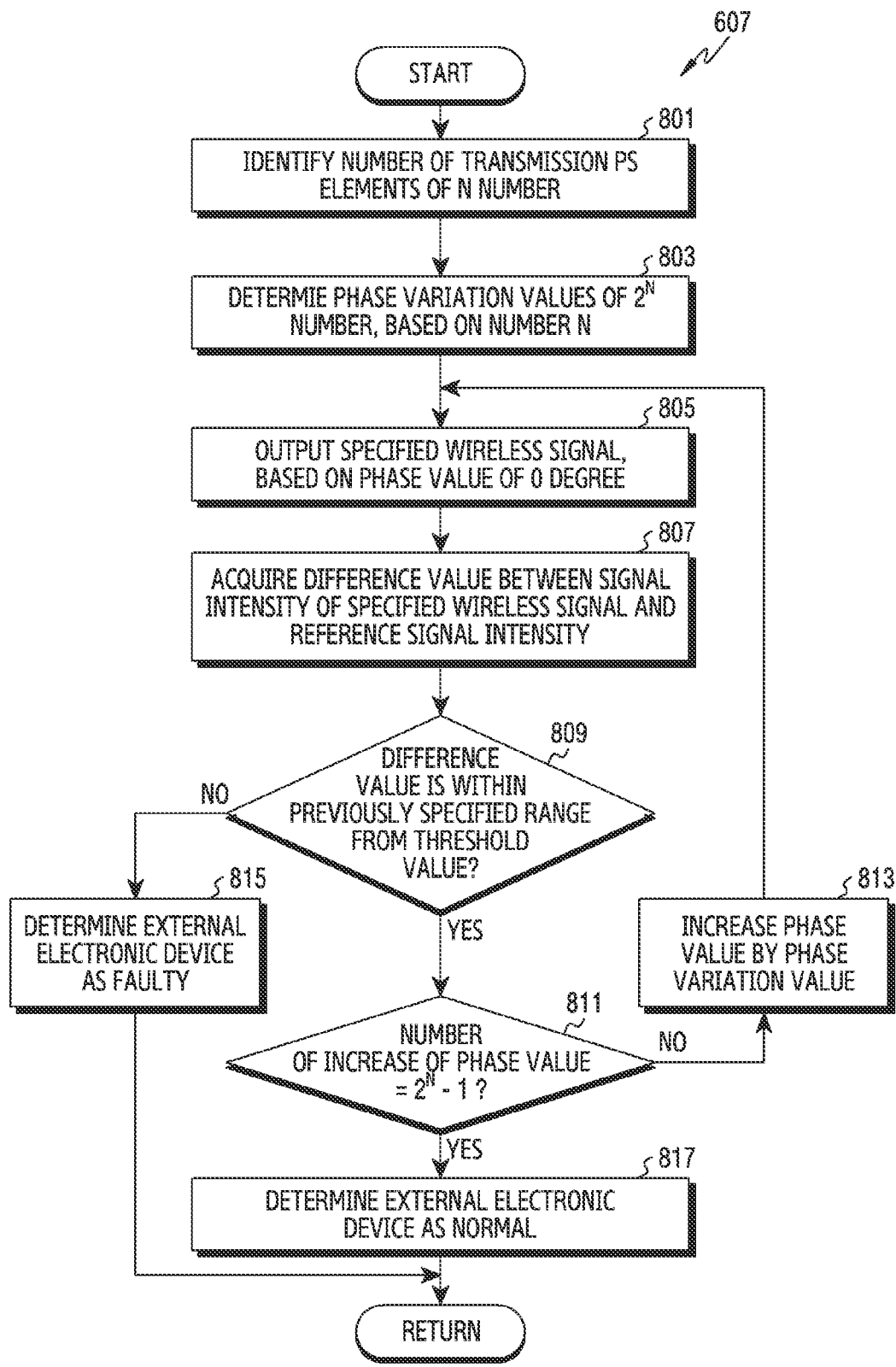
FIG. 8A illustrates a detailed flowchart for determining a status of a wireless communication device according to various embodiments of the present disclosure.

FIG. 8A illustrates a flowchart of an electronic device for determining a status of an external electronic device according to various embodiments of the present disclosure. The external electronic device can correspond to the wireless communication device 260 shown in FIG. 2B, and the electronic device can correspond to the PC 550 shown in FIG. 5.

Referring to FIG. 8A, in operation 801, a processor of the electronic device 550 can identify the number of transmission PS elements of an N number. For example, when the antenna 1 710 to the antenna 4 740 included in the 1×4 antenna array of the connected external electronic device 260 each include four transmission PS elements respectively, the N can correspond to 4. For another example, when many antennas included in an antenna array of the external electronic device 260 each include eight transmission PS elements, the N can correspond to 8. For further example, antennas included in an antenna array of the external electronic device 260 each can include sixteen transmission PS elements, and the N can correspond to 16.

In operation 803, the processor of the electronic device 550 can determine phase variation values of a $2^N$ number on the basis of the number (N). In accordance with an embodiment, when each antenna included in an antenna array includes four transmission PS elements, the N corresponds to 4 and therefore, the number of phase variation values can correspond to 16. Accordingly, the processor of the electronic device 550 can set sixteen phase variation values at intervals of 22.5 degrees which is a value dividing 360 degrees by 16. For example, an nth phase variation value can correspond to a value of n×22.5. That is, a first phase variation value can correspond to 22.5 degrees, and a second phase variation value can do to 45 degrees. In accordance with another embodiment, when many antennas included in an antenna array each include three transmission PS elements, the N corresponds to 3 and therefore, the number of phase variation values can correspond to 8. Accordingly, the processor of the electronic device 550 can set eight phase variation values at intervals of 45 degrees which is a value dividing 360 degrees by 8.

In operation 805, the processor of the electronic device 550 can control to output a specified wireless signal on the basis of a phase value of 0 degree. For example, when each antenna included in the antenna array of the external electronic device 260 includes four transmission PS elements, the processor of the electronic device 550 can control the external electronic device 260 to output a specified wireless signal on the basis of a phase variation value of 22.5 degrees. In accordance with an embodiment, the processor of the electronic device 550 can control to output a specified wireless signal on the basis of a phase value of 0 degree. The processor of the electronic device 550 can control to output a signal corresponding to a phase of 0 degree to the first antenna array 280, and output a signal corresponding to a phase of 180 degrees which is an antiphase to the 0 degree to the second antenna array 285. Because corresponding to a mutual antiphase relationship, signals outputted form the antenna 3 730 and the antenna 4 740 can form a destructive field. The specified wireless signal can form a beam by remaining signals (e.g., signals outputted from the antenna 1 710 and the antenna 2 720) excepting the signals outputted from the antenna 3 730 and the antenna 4 740 forming the destructive field.

In operation 807, the processor of the electronic device 550 can acquire a difference value between a signal intensity of the specified wireless signal and the reference signal intensity. A detailed description of operation 807 can refer to the description of operation 607. In operation 809, the processor of the electronic device 550 can determine whether the difference value is within a previously specified range from a threshold value. A detailed description of operation 809 can refer to the description of operation 607.

In operation 811, the processor of the electronic device 550 can determine whether the number of increase of a phase value corresponds to $2^N-1$. In accordance with an embodiment, when N=3, the processor of the electronic device 550 can determine whether the number of increase of the phase value is $2^3-1=7$. For example, on the basis of a phase value of 0 degree, the processor of the electronic device 550 can control the external electronic device (for example, the wireless communication device 531) to output a wireless signal according to the phase value of 0 degree. When the difference value between the signal intensity of the specified wireless signal and the reference signal intensity is included in the previously specified range from the threshold value, the processor of the electronic device 550 can determine the number of increase of the phase value. Because not increasing the phase value, the processor of the electronic device 550 can determine the number of increase of the phase value as 0, and perform operation 813.

For another example, the processor of the electronic device 550 can control the external electronic device to output a wireless signal on the basis of a phase value of 45 degrees. That is, when N=3, the phase variation value is $360/(2^3)=45$ and therefore, the processor of the electronic device 550 can know that a phase increase has been executed one time, through the phase value set as 45 degrees. Because the number of increase of the phase value does not correspond to $2^3-1=7$, the processor of the electronic device 550 can perform operation 813.

For further example, the processor of the electronic device 550 can control the external electronic device to output a wireless signal on the basis of a phase value of 315 degrees. That is, when N=3, the phase variation value is $360/(2^3)=45$ and therefore, the processor of the electronic device 550 can know that the number of increase of the phase value has been executed as 315/45=7 times, through the phase value set as 315 degrees. Because the number of increase of the phase value corresponds to 7 times, the processor of the electronic device 550 can perform operation 817.

In operation 813, the processor of the electronic device 550 can increase the phase value as much as the phase variation value. For example, when the number of increase of the phase value does not correspond to $2^N-1$, the processor of the electronic device 550 can increase the phase value by the phase variation value. For example, referring to FIG. 8B (a) to (h), when N=3, the processor of the electronic device 550 can determine a phase variation value as $360/(2^3)=45$, and increase a phase as much as 45 degrees while controlling the external electronic device 260 to output a wireless signal. In accordance with another embodiment, though not illustrated, when the number of a plurality of PS elements is five, the processor of the electronic device 550 can increase the phase variation value as much as 11.25 degrees.

In operation 815, the processor of the electronic device 550 can determine the external electronic device 260 as faulty. In response to at least one antenna not being normally operated, a destructive field dependent on an antiphase may not be provided. When the destructive field is not provided, the signal intensity value of the specified wireless signal can decrease by a value less than a threshold value, compared to a reference signal intensity at which a plurality of antennas all output signals at the same phase. In response to obtaining that a difference between the signal intensity of the specified wireless signal and the reference signal intensity is less than the threshold value, the processor of the electronic device 550 can determine that at least one of the plurality of antennas included in the external electronic device 260 is not normally operated.

In operation 817, the processor of the electronic device 550 can determine the external electronic device 260 as normal. When the number of increase of the phase value of the external electronic device 260 corresponds to $2^N-1$, the processor of the electronic device 550 can determine that the external electronic device 260 normally outputs a wireless signal, for all phase values of 0 degree to 360 degrees.

Figure 8B:
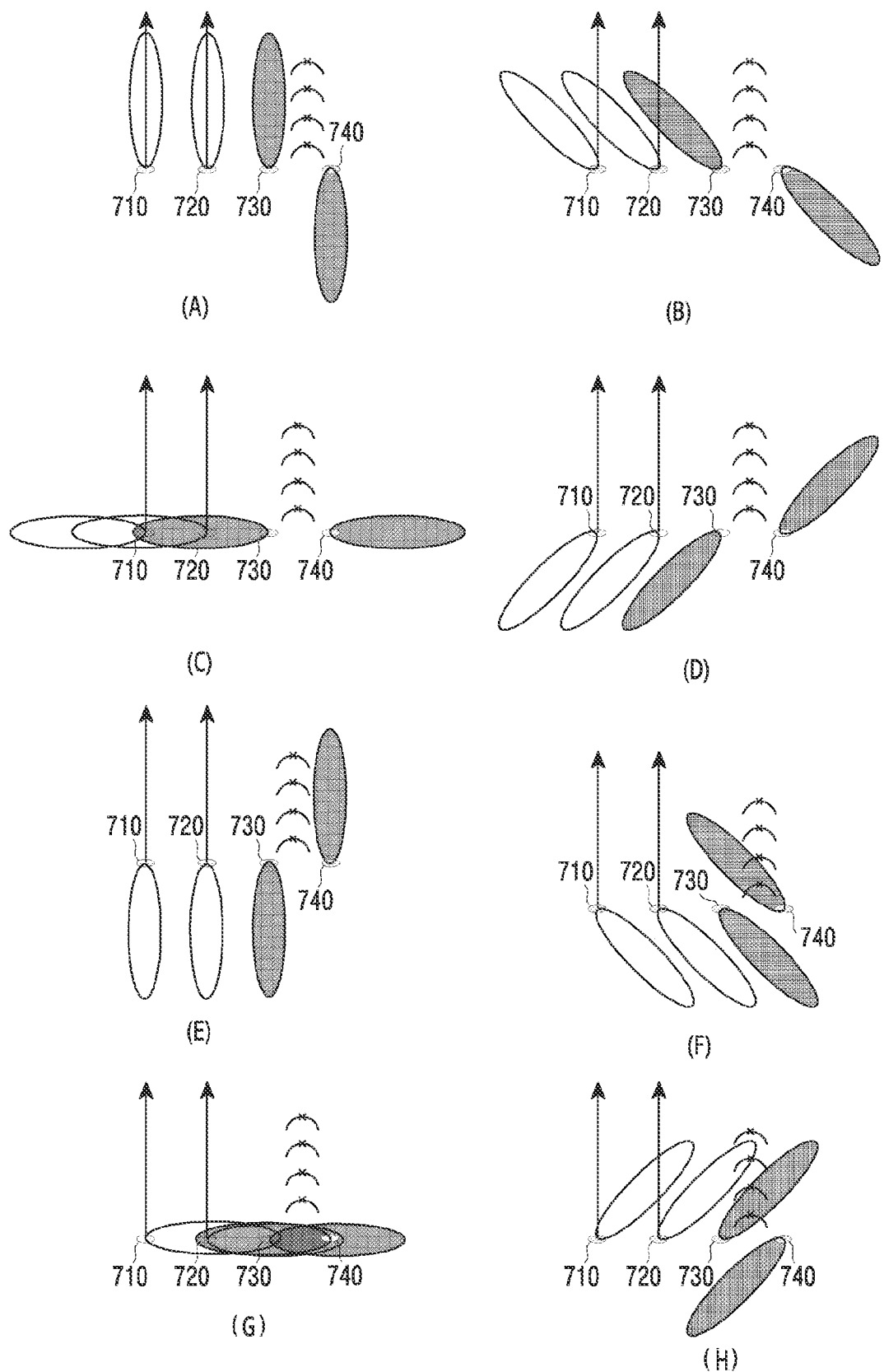
FIG. 8B illustrates an example of outputting an antiphase signal on the basis of a phase variation value according to various embodiments of the present disclosure.

FIG. 8B illustrates an example of outputting an antiphase signal on the basis of a phase variation value according to various embodiments of the present disclosure.

Referring to a status (a) of FIG. 8B, the processor of the electronic device 550 can set a phase value of the external electronic device 260 by 0 degree. The processor of the electronic device 550 can control the antenna 4 740 of the external electronic device 260 to output an antiphase signal. Accordingly, a phase of the antenna 4 740 can be in an antiphase relationship with phases of remaining antennas (for example, the antenna 1 710 to the antenna 3 730). Referring to figure (a), the antenna 1 710 to the antenna 3 730 can output signals on the basis of a phase value of 0 degree, and the antenna 4 740 can output a signal on the basis of a phase value of 180 degrees. For example, in response to the antenna 4 740 not outputting the signal at the antiphase (that is, the antenna 1 710 to the antenna 4 740 all outputting signals of the same phase), the signal detecting unit 511 of FIG. 5 can receive all of the signals outputted from the antenna 1 710 to the antenna 4 740. For another example, in response to the antenna 4 740 outputting a signal at the antiphase, the signal outputted from the antenna 3 730 and the signal outputted from the antenna 4 740 can mutually form a destructive field. The signals forming the destructive field are not obtained by the signal detecting unit 511, so the signal detecting unit 511 can receive only the signals outputted from the antenna 1 710 and the antenna 2 720. The signals outputted from the antenna 1 710 and the antenna 2 720 are signals outputted according to the phase value of 0 degree respectively, so a phase difference between the signals does not exist. Accordingly, wireless signals outputted from the antenna 1 710 and the antenna 2 720 can proceed towards the signal detecting unit 511 in a straight direction, with a direction not turned.

Referring to a status (b) of FIG. 8B, the processor of the electronic device 550 can increase the phase value of the external electronic device 260 by 45 degrees. The phase values of the antenna 1 710 to the antenna 3 730 can be set as 0+45=45 degrees. The phase value of the antenna 4 740 can be set as 180+45=225 degrees (or −180+45=−135 degrees). That is, the phases of the antenna 1 710 to the antenna 3 730 and the phase of the antenna 4 740 can still correspond to an antiphase relationship. The signal outputted from the antenna 3 730 according to the phase of 45 degrees and the signal outputted from the antenna 4 740 according to the phase of 225 degrees can mutually form a destructive field. As the destructive field is formed, the signal detecting unit 511 can receive only the signals outputted from the antenna 1 710 and the antenna 2 720.

Though not illustrated, in response to a transmission PS element of the antenna 3 730 being broken down, the phase of the antenna 3 730 may not be increased as much as 45 degrees. In response to the phase of the antenna 3 730 not being increased as much as 45 degrees, the destructive field with the antenna 4 740 is not formed, and a signal intensity measured by the signal detecting unit 511 can be changed wherein a difference value with the reference signal intensity exceeds a previously specified range from a threshold value.

Referring to a status (c) to a status (h) of FIG. 8B, the processor of the electronic device 550 can iteratively increase the phase value of the external electronic device 260. For example, the status (c) of FIG. 8B can correspond to a status of changing a phase as much as 90 degrees. The status (d) can correspond to a status of increasing the phase as much as 135 degrees. The status (e) can correspond to a status of increasing the phase as much as 180 degrees. The status (f) can correspond to a status of increasing the phase as much as 225 degrees, and the status (g) can correspond to a status of increasing the phase as much as 270 degrees, and the status (h) can correspond to a status of increasing the phase as much as 315 degrees. When a difference value between a signal intensity of a specified wireless signal outputted according to the phase values of 0 degree to 315 degrees of the status (a) to the status (h) and the reference signal intensity is included within the previously specified range from the threshold value, the processor of the electronic device 550 can determine that the external electronic device 260 is normally operated. That is, under a condition in which a plurality of PS elements included in the antenna 1 710 to the antenna 4 740 all are normally operated, the external electronic device 260 can be determined as normal.

Referring to FIG. 8B, it is illustrated that, when a transmission PS element is an N number, the electronic device (e.g., the PC 550 of FIG. 5) of various embodiments determines whether the external electronic device 260 is normally operated, based on a phase value of 0 degree to each of phase variation values of an $2^N$ number, but an embodiment is not limited to this. In accordance with an embodiment, the electronic device 550 can identify that a phase variation value corresponds to 180 degrees and, in response to the identifying, determine to normally operate the external electronic device 260. In response to the phase variation value corresponding to 180 degrees, transmission PS elements of an N number each can be activated minimally one time or more. In response to iteratively changing a phase from a phase value of 0 degree to a phase value of 180 degrees while outputting a specified wireless signal, the transmission PS elements of the external electronic device 260 each can be activated minimally one time or more. Accordingly, though not performing the measurement of a phase variation value of 180 degrees to 360 degrees, the processor of the electronic device 550 can determine that the plurality of PS elements 410 to 440 are normally operated, and can determine that the transmission PS elements of the external electronic device 260 all are normally operated. When the phase variation value corresponds to 180 degrees, and the difference value between a signal intensity of a wireless signal outputted based on the phase value of 180 degrees and the reference signal intensity is within the previously specified range, the processor of the electronic device 550 can omit the performing of operation 811. For example, the processor of the electronic device 550 can output a specified wireless signal on the basis of a phase value of 180 degrees, and determine that the difference value with the reference signal intensity is within the previously specified range from the threshold value. The processor of the electronic device 550 can determine the number of increase of a phase value, by dividing the phase value set as 180 degrees by the phase variation value $(360/(2^3)=45)$ of when N=3. In response to N=3 and being set by the phase value of 180 degrees, the number of increase of the phase value can be 180/45=4 times. Although the number of increase of the phase value does not correspond to $2^3-1=7$ in operation 811, the processor of the electronic device 550 can omit the performing of operation 813, and determine the external electronic device 260 as normal through operation 817. Accordingly to this, the processor of the electronic device 550 can effectively decrease a time and cost for determining whether many external electronic devices are normally operated.

An electronic device (e.g., the PC 550 of FIG. 5) of various embodiments can include an antenna configured to receive wireless signals outputted from a first antenna (e.g., the first antenna array 280 of FIG. 2B) and a second antenna (e.g., the second antenna array 285 of FIG. 2B) included in an external electronic device (e.g., the electronic device 200 of FIG. 2A), a communication circuit electrically connected to the antenna, and a control circuit. The control circuit can be configured to control the external electronic device wherein the external electronic device outputs specified wireless signals at a first specified phase by using the first antenna 280 and at a second specified phase by using the second antenna 285, receive the specified wireless signals by using the antenna, identify a signal intensity corresponding to the specified wireless signals by using the communication circuit, and determine a status related to the external electronic device 200 at least on the basis of a difference value between the specified signal intensity and a reference signal intensity.

The specified wireless signals of various embodiments can include a signal provided by the first antenna 280 and corresponding to the first specified phase and a signal provided by the second antenna 285 and corresponding to the second specified phase.

The control circuit of various embodiments can be configured to, in response to the difference value being less than a previously set range, determine that the external electronic device 200 is faulty.

The control circuit of various embodiments can be configured to, in response to the difference value being greater than or being less than a previously set range, determine that the external electronic device 200 is normal.

The signal corresponding to the second specified phase of various embodiments can be more delayed, as much as a half time of a cycle of the signal corresponding to the first specified phase, than the signal corresponding to the first specified phase and be outputted.

The external electronic device 200 of various embodiments can include a plurality of phase shifters connected to the first antenna 280 and the second antenna 285. The control circuit can be configured to delay phases of the first antenna 280 and the second antenna 285 by the number of times corresponding to the number of the plurality of phase shifters.

The control circuit of various embodiments can be configured to determine whether the delayed phase value corresponds to 180 degrees.

The control circuit of various embodiments can be configured to, in response to the delayed phase value corresponding to 180 degrees, determine that the external electronic device 200 is normal.

The reference signal intensity of various embodiments can correspond to a signal intensity of a signal which is outputted at the first specified phase by using the first antenna 280 and at the first specified phase by using the second antenna 285.

An electronic device 550 of various embodiments can include an antenna configured to receive wireless signals outputted from a first antenna 280 and a second antenna 285 included in an external electronic device 200, a communication circuit electrically connected to the antenna, and a control circuit. The control circuit can be configured to control the external electronic device wherein the external electronic device 200 outputs first wireless signals at a first specified phase by using the first antenna 280 and at the first specified phase by using the second antenna, control the external electronic device 200 wherein the external electronic device outputs second signals at the first specified phase by using the first antenna 280 and at a second specified phase by using the second antenna 285, receive the first wireless signals and the second wireless signals by using the antenna, identify a first signal intensity corresponding to the first wireless signals and a second signal intensity corresponding to the second wireless signals by using the communication circuit, and determine a status related to the external electronic device 200 at least on the basis of a difference value between the first signal intensity and the second signal intensity.

The control circuit of various embodiments can be configured to, in response to the difference value not being included within a previously specified range from a threshold value, determine that the external electronic device 200 is faulty.

The control circuit of various embodiments can be configured to, in response to the difference value being within the previously specified range from the threshold value, determine that the external electronic device 200 is normal.

The signal corresponding to the second specified phase of various embodiments can be more delayed, as much as a half time of a cycle of the signal corresponding to the first specified phase, than the signal corresponding to the first specified phase and be outputted.

The external electronic device 200 of various embodiments can include a plurality of phase shifters connected to the first antenna 280 and the second antenna 285. The control circuit can be configured to delay phases of the first antenna 280 and the second antenna 285 by the number of times corresponding to the number of the plurality of phase shifters.

The control circuit of various embodiments can be configured to determine whether the delayed phase value corresponds to 180 degrees.

The control circuit of various embodiments can be configured to, in response to the delayed phase value corresponding to 180 degrees, determine that the external electronic device 200 is normal.

The reference signal intensity of various embodiments can correspond to a signal intensity of a signal which is outputted at the first specified phase by using the first antenna 280 and at the first specified phase by using the second antenna 285.

The second signals of various embodiments can be configured to form a destructive field with at least a portion of the first signals.

An electronic device (e.g., the electronic device 200 of FIG. 2A) of various embodiments can include a first antenna 280 and a second antenna 285, a communication circuit (e.g., the communication module 250 of FIG. 2A) electrically connected to the first antenna 280 and the second antenna 285, and a control circuit (e.g., the processor 240 FIG. 2A). The control circuit 240 can be configured to receive a control signal from an external electronic device (e.g., the PC 550 of FIG. 5A), and output specified wireless signals at a first specified phase by using the first antenna 280 and at a second specified phase by using the second antenna 285, according to the control signal.

The external electronic device 550 of various embodiments can be configured to determine a status related to the electronic device 200 on the basis of a difference value between a signal intensity corresponding to the specified wireless signals and a reference signal intensity.

Methods of embodiments mentioned in the claims or specification of the present disclosure can be implemented in the form of hardware, software, or a combination of hardware and software.

In response to being implemented with software, a computer-readable storage media storing one or more programs (software modules) can be provided. The one or more programs stored in the computer-readable storage media are configured to be executable by one or more processors within an electronic device. The one or more programs include instructions for enabling the electronic device to execute the methods of the embodiments stated in the claims or specification of the present disclosure.

These programs (i.e., software modules and/or software) can be stored in a random access memory (RAM), a non-volatile memory including a flash memory, a read only memory (ROM), an electrically erasable programmable ROM (EEPROM), a magnetic disc storage device, a compact disc-ROM (CD-ROM), digital versatile discs (DVDs), an optical storage device of another form, and/or a magnetic cassette. Or, it can be stored in a memory that is configured in combination of some of them or all. Also, each configured memory can be included in plural as well.

Also, the program can be stored in an attachable storage device that can access via a communication network such as the Internet, an intranet, a local area network (LAN), a wireless LAN (WLAN) or a storage area network (SAN), or a communication network configured in combination of them. This storage device can access a device performing an embodiment of the present disclosure via an external port. Also, a separate storage device on the communication network can access the device performing the embodiment of the present disclosure as well.

In the aforementioned concrete embodiments of the present disclosure, a component included in the disclosure has been expressed in a singular form or a plural form according to a proposed concrete embodiment. But, the expression of the singular form or plural form is selected suitable to a given situation for description convenience's sake, and the present disclosure is not limited to singular or plural components. Even a component expressed in the plural form can be constructed in the singular form, or even a component expressed in the singular form can be constructed in the plural form.

On the other hand, in a detailed description of the present disclosure, a concrete embodiment has been described, but it is undoubted that various modifications are available without departing from the scope of the present disclosure. Therefore, the scope of the present disclosure should not be limited to and defined by the described embodiment and should be defined by not only claims mentioned below but also equivalents to these claims.

The invention claimed is:

1. An electronic device comprising:
an antenna configured to receive wireless signals outputted from a first antenna and a second antenna included in an external electronic device;
a communication circuit electrically connected to the antenna; and
a control circuit,
wherein the control circuit is configured to:
control the external electronic device wherein the external electronic device outputs specified wireless signals at a first specified phase by using the first antenna and at a second specified phase by using the second antenna,
receive the specified wireless signals by using the antenna,
identify a signal intensity corresponding to the specified wireless signals by using the communication circuit, and determine a status related to the external electronic device at least on the basis of a difference value between the specified signal intensity and a reference signal intensity,
wherein the external electronic device comprises a plurality of phase shifters connected to the first antenna and the second antenna, and
wherein the control circuit is configured to delay phases of the first antenna and the second antenna by a number of times corresponding to a number of the plurality of phase shifters.

2. The electronic device of claim 1, wherein the specified wireless signals comprise a signal provided by the first antenna and corresponding to the first specified phase and a signal provided by the second antenna and corresponding to the second specified phase.

3. The electronic device of claim 1, wherein the control circuit is configured to, in response to the difference value being out of a previously specified range from a threshold value, determine that the external electronic device is faulty.

4. The electronic device of claim 1, wherein the control circuit is configured to, in response to the difference value being within a previously specified range from a threshold value, determine that the external electronic device is normal.

5. The electronic device of claim 1, wherein the signal corresponding to the second specified phase is more delayed, as much as a half time of a cycle of the signal corresponding to the first specified phase, than the signal corresponding to the first specified phase and is outputted.

6. The electronic device of claim 1, wherein the control circuit is configured to determine whether the delayed phase value corresponds to 180 degrees.

7. The electronic device of claim 6, wherein the control circuit is configured to, in response to the delayed phase value corresponding to 180 degrees, determine that the external electronic device is normal.

8. The electronic device of claim 1, wherein the reference signal intensity corresponds to a signal intensity of a signal which is outputted at the first specified phase by using the first antenna and at the first specified phase by using the second antenna.

9. A method for identifying a status of an external electronic device in an electronic device, the method comprising:
controlling the external electronic device comprising a first antenna and a second antenna wherein the external electronic device outputs specified wireless signals at a first specified phase by using the first antenna and at a second specified phase by using the second antenna;
receiving the specified wireless signals by using an antenna of the electronic device;
identifying a signal intensity corresponding to the specified wireless signals by using a communication circuit of the electronic device;
determining status related to the external electronic device at least on the basis of a difference value between the specified signal intensity and a reference signal intensity; and
delaying phases of the first antenna and the second antenna by a number of times corresponding to a number of a plurality of phase shifters comprised in the external electronic device and connected to the first antenna and the second antenna.

10. The method of claim 9, wherein the specified wireless signals comprise a signal provided by the first antenna and corresponding to the first specified phase and a signal provided by the second antenna and corresponding to the second specified phase.

11. The method of claim 9, further comprising, in response to the difference value being out of a previously specified range from a threshold value, determining that the external electronic device is faulty.

12. The method of claim 9, further comprising, in response to the difference value being within a previously specified range from a threshold value, determining that the external electronic device is normal.

13. The method of claim 9, wherein the signal corresponding to the second specified phase is more delayed, as much as a half time of a cycle of the signal corresponding to the first specified phase, than the signal corresponding to the first specified phase and is outputted.

* * * * *